US009751976B2

(12) United States Patent
Ono et al.

(10) Patent No.: US 9,751,976 B2
(45) Date of Patent: Sep. 5, 2017

(54) TONER BINDER AND TONER

(71) Applicant: Sanyo Chemical Industries, Ltd., Kyoto (JP)

(72) Inventors: Takashi Ono, Kyoto (JP); Kazuki Sugiyama, Kyoto (JP); Takaaki Bando, Kyoto (JP); Yasuaki Ota, Kyoto (JP); Takahiro Tanaka, Kyoto (JP); Taiji Yamashita, Kyoto (JP); Kakuhiro Kawaguchi, Kyoto (JP)

(73) Assignee: Sanyo Chemical Industries, Ltd., Kyoto (JP)

( * ) Notice: Subject to any disclaimer, the term of this patent is extended or adjusted under 35 U.S.C. 154(b) by 0 days.

(21) Appl. No.: 14/906,756

(22) PCT Filed: Jul. 22, 2014

(86) PCT No.: PCT/JP2014/069289
§ 371 (c)(1),
(2) Date: Jan. 21, 2016

(87) PCT Pub. No.: WO2015/012251
PCT Pub. Date: Jan. 29, 2015

(65) Prior Publication Data
US 2016/0159976 A1 Jun. 9, 2016

(30) Foreign Application Priority Data

Jul. 23, 2013 (JP) ................................ 2013-153016

(51) Int. Cl.
| G03G 9/087 | (2006.01) |
| C08G 63/46 | (2006.01) |
| C08G 63/668 | (2006.01) |

(52) U.S. Cl.
CPC .......... C08G 63/46 (2013.01); C08G 63/668 (2013.01); G03G 9/08755 (2013.01); G03G 9/08795 (2013.01); G03G 9/08797 (2013.01)

(58) Field of Classification Search
CPC .. C08G 63/46; C08G 63/668; G03G 9/08795; G03G 9/08755; G03G 9/08797
See application file for complete search history.

(56) References Cited

U.S. PATENT DOCUMENTS

| 6,232,027 B1 | 5/2001 | Matsunaga et al. |
| 2010/0159386 A1 | 6/2010 | Urabe et al. |
| 2010/0261113 A1* | 10/2010 | Aruga ................... G03G 9/0804 430/105 |
| 2011/0229809 A1 | 9/2011 | Nukada et al. |
| 2012/0214960 A1 | 8/2012 | Joung et al. |
| 2013/0164669 A1 | 6/2013 | Yamashita et al. |

FOREIGN PATENT DOCUMENTS

| EP | 1 887 430 A1 | 2/2008 |
| EP | 2626744 A1 | 8/2013 |
| JP | 03-046668 A | 2/1991 |
| JP | 11-305481 A | 11/1999 |
| JP | 2000-227678 A | 8/2000 |
| JP | 2006-038959 A | 2/2006 |
| JP | 2008-112074 A | 5/2008 |
| JP | 2010-256892 A | 11/2010 |
| JP | 2010-262100 A | 11/2010 |
| JP | 2011-128574 A | 6/2011 |
| JP | 2011-197131 A | 10/2011 |
| JP | 2012-107228 A | 6/2012 |
| JP | 2012-159805 A | 8/2012 |
| JP | 2013-047702 A | 3/2013 |
| JP | 2013-508500 A | 3/2013 |
| WO | WO-2010/143385 A1 | 12/2010 |
| WO | WO-2012/046445 A1 | 4/2012 |

OTHER PUBLICATIONS

International Search Report mailed Sep. 2, 2014, issued for PCT/JP2014/069289.
Extended European Search Report issued in corresponding European Patent Application No. EP 14829620.5, dated Feb. 24, 2017.

* cited by examiner

*Primary Examiner* — Thorl Chea
(74) *Attorney, Agent, or Firm* — Locke Lord LLP; James E. Armstrong, IV; Nicholas J. DiCeglie, Jr.

(57) ABSTRACT

A toner binder comprising a polyester, the end of which is partially esterified with a monocarboxylic acid and/or a monohydric alcohol, the polyhydric alcohol component of which comprises a $C_3$ alkylene glycol (a21) and an aromatic-ring-bearing diol (a22) at an (a21)/(a22) molar ratio of 5/95 to 70/30, and which has an ester group concentration of 16 to 30 wt % and satisfies a specific relationship between the ester group concentration and the hydroxy value. The toner binder combines low-temperature fixability and storage stability under high-temperature conditions or heat-temperature and -humidity conditions, and exhibits excellent durability.

10 Claims, 1 Drawing Sheet

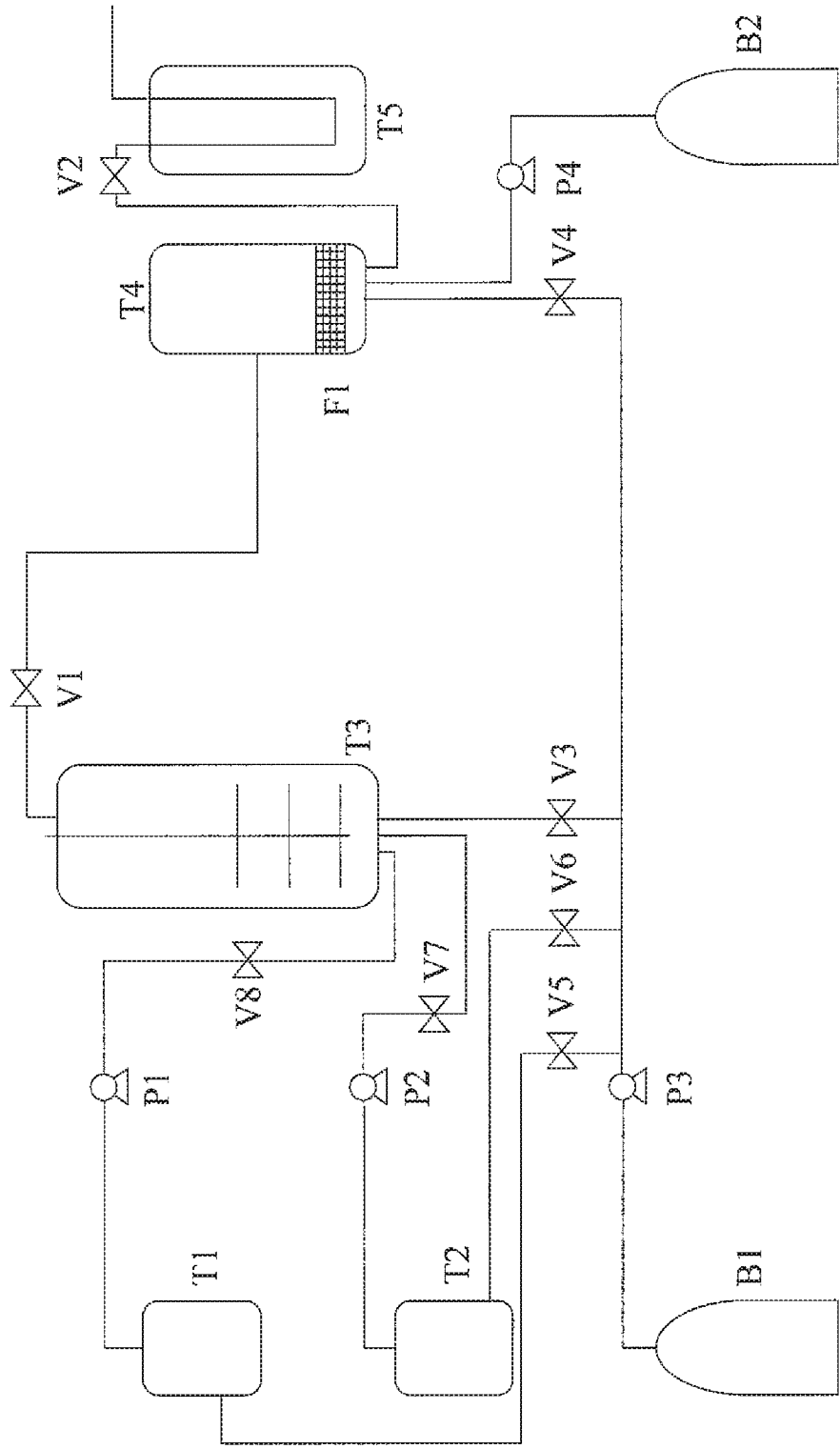

TONER BINDER AND TONER

TECHNICAL FIELD

The present invention relates to a toner binder and a toner.

BACKGROUND ART

Toner binders for use in electrophotography adopting a heat fixing system, which is a system of image fixation commonly applied in copiers, printers, and the like, are required to be capable of fixing a toner even at a low fixing temperature (low-temperature fixability), and to have heat-resistant storage stability and storage stability under a high-temperature and high-humidity environment (moisture heat-resistant storage stability). Development of a toner binder capable of attaining a combination of low-temperature fixability with heat-resistant storage stability and moisture heat-resistant storage stability has been demanded because an attempt to improve low-temperature fixability will lead to deterioration in heat-resistant storage stability and moisture heat-resistant storage stability, whereas an attempt to improve heat-resistant storage stability and moisture heat-resistant storage stability will lead to deterioration in low-temperature fixability.

For example, a toner binder comprising an amorphous polyester having a furan ring for attaining a combination of low-temperature fixability and heat-resistant storage stability has been proposed (Patent Document 1). Moreover, methods using an aromatic monocarboxylic acid (Patent Documents 2, 3), a toner binder comprising one or more species selected from aliphatic monools and aliphatic monocarboxylic acids (Patent Document 4), toner binders prepared by reacting a polyester resin with an isocyanate compound (Patent Documents 5, 6), a polyester in which 30% or more of hydroxy groups or acid groups are capped with a masking agent (Patent Document 7), etc. have been proposed.

Furthermore, as a general matter, an ingredient contained in a toner might attach to a member constituting a copier or a printer, for example, a developer tank which stores a developer therein, and this might cause image degradation.

PRIOR ART DOCUMENTS

Patent Documents

Patent Document 1: JP-A-2012-107228
Patent Document 2: JP-A-2010-256892
Patent Document 3: JP-A-2011-8246
Patent Document 4: Domestic Re-publication of WO 2010/143385
Patent Document 5: JP-A-11-305481
Patent Document 6: JP-A-2006-38959
Patent Document 7: JP-A-03-46668

SUMMARY OF THE INVENTION

Problems to be Solved by the Invention

Although the toner compositions of Patent Documents 1 to 7 are effective for providing a combination of low-temperature fixability with heat-resistant storage stability and moisture heat-resistant storage stability, such effects are not fully satisfactory. No satisfactory means for suppressing staining of members such as a developer tank are known.

Solutions to the Problems

In order to solve these problems, the present inventors have studied intensively, and thus have achieved the present invention.

That is, the present invention relates to a toner binder comprising a polyester resin (A) having, as constitutional units, a polycarboxylic acid (a1) as a polycarboxylic acid component and a polyhydric alcohol (a2) as a polyhydric alcohol component and having been esterified with a monocarboxylic acid (a3) and/or a monohydric alcohol (a4) at a part of the terminals thereof, wherein the ester group concentration of (A) based on the weight of (A) is 16 to 30% by weight, the polyhydric alcohol (a2) comprises an alkylene glycol (a21) having three carbon atoms and a diol (a22) having an aromatic ring, the molar ratio of (a21) to (a22) is (a21)/(a22)=5/95 to 70/30, and (A) fulfills the following condition 1; and a toner containing this toner binder, a colorant, and a mold release agent:

$$229\times(ECON)+90\times(OHV)\leq 12{,}000 \qquad [\text{Condition 1}]$$

wherein (ECON) denotes a value representing the ester group concentration of (A) expressed by the unit of % by weight, and (OHV) denotes a value representing the hydroxy value of (A) expressed by the unit of mgKOH/g.

Advantages of the Invention

The toner binder of the present invention can attain a combination of low-temperature fixability with heat-resistant storage stability and moisture heat-resistant storage stability of a toner and is excellent in durability. Moreover, it exhibits only a little stain to such members as a developer tank (herein the property is also referred to as member staining property).

BRIEF DESCRIPTION OF THE DRAWINGS

FIG. 1 is a flowchart of an experimental device using liquid state or supercritical state carbon dioxide to be used for the production of resin particles according to the present invention.

MODE FOR CARRYING OUT THE INVENTION

The toner binder of the present invention is described below.

The toner binder of the present invention comprises a polyester resin (A) having, as constitutional units, a polycarboxylic acid (a1) as a polycarboxylic acid component and a polyhydric alcohol (a2) as a polyhydric alcohol component and having been esterified with a monocarboxylic acid (a3) and/or a monoalcohol (a4) at a part of the terminals thereof. In addition, the ester group concentration of (A) based on the weight of this polyester resin (A) is 16 to 30% by weight, the polyhydric alcohol (a2) comprises an alkylene glycol (a21) having three carbon atoms and a diol (a22) having an aromatic ring, and the molar ratio of (a21) to (a22) is (a21)/(a22)=5/95 to 70/30. Moreover, the polyester resin (A) fulfills the following condition 1:

$$229\times(ECON)+90\times(OHV)\leq 12{,}000 \qquad [\text{Condition 1}]$$

wherein (ECON) denotes a value representing the ester group concentration of (A) expressed by the unit of % by weight, and (OHV) denotes a value representing the hydroxy value of (A) expressed by the unit of mgKOH/g.

The polyester resin (A) in the present invention has a polycarboxylic acid (a1) and a polyhydric alcohol (a2) as constitutional units.

Examples of the polycarboxylic acid (a1) include a dicarboxylic acid (a11)), a 3 to 6 or more valent polycarboxylic acid (a12), and a modified form (a13) of (a11) or (a12). Regarding (a1), a single species thereof may be used or alternatively two or more species thereof may be used in combination.

Examples of the dicarboxylic acid (a11) include alkane dicarboxylic acids having 4 to 32 carbon atoms (for example, succinic acid, adipic acid, sebacic acid, azelaic acid, dodecanedicarboxylic acid, and octadecanedicarboxylic acid); alkene dicarboxylic acids having 4 to 32 carbon atoms (for example, maleic acid, fumaric acid, citraconic acid, and mesaconic acid); branched alkene dicarboxylic acids having 8 to 40 carbon atoms [for example, dimer acid, alkenylsuccinic acids (dodecenylsuccinic acid, pentadecenylsuccinic acid, octadecenylsuccinic acid, and the like); branched alkane dicarboxylic acids having 12 to 40 carbon atoms [for example, alkylsuccinic acids (decylsuccinic acid, dodecylsuccinic acid, octadecylsuccinic acid, and the like); and aromatic dicarboxylic acids having 8 to 20 carbon atoms (for example, phthalic acid, isophthalic acid, terephthalic acid, and naphthalene dicarboxylic acid).

Preferred of these are alkene dicarboxylic acids and aromatic dicarboxylic acids, and aromatic dicarboxylic acids are more preferred.

Examples of the 3 to 6 or more valent polycarboxylic acid (a12) include aromatic polycarboxylic acids having 9 to 20 carbon atoms (for example, trimellitic acid and pyromellitic acid), and aliphatic (including alicyclic) polycarboxylic acids having 6 to 36 carbon atoms (hexane tricarboxylic acid, decane tricarboxylic acid, etc.).

Examples of the modified form (a13) of (a11) or (a12) include an acid anhydride of (a11) or (a12), and a lower alkyl ester of (a11) or (a12).

Examples of the acid anhydride of (a11) or (a12) include trimellitic anhydride, phthalic anhydride, maleic anhydride, and pyromellitic anhydride.

Examples of the lower alkyl ester of (a11) or (a12) include methyl esters, ethyl esters, and isopropyl esters.

Examples of the polyhydric alcohol (a2) include a diol and a tri- to octa- or more-hydric polyol. Regarding (a2), a single species thereof may be used or alternatively two or more species thereof may be used in combination.

In the polyhydric alcohol (a2) constituting the polyester resin (A) of the present invention, the polyhydric alcohol (a2) comprises (a21) an alkylene glycol having three carbon atoms and (a22) a diol having an aromatic ring as essential ingredients.

Examples of the alkylene glycol having three carbon atoms (a21) include 1,2-propylene glycol and 1,3-propylene glycol.

Examples of the diol having an aromatic ring (a22) include alkylene oxide adducts of bisphenols (bisphenol A, bisphenol F, bisphenol S, etc.) or polyphenols (for example, catechol, hydroquinone, and resorcin). Preferred are alkylene oxide adducts of bisphenol A, and, particularly preferred are an ethylene oxide adduct, a propylene oxide adduct, and a butylene oxide adduct of bisphenol A, etc. Preferably, the number of moles of addition is 2 to 6.

The content ratio of the alkylene glycol having three carbon atoms (a21) and the diol having an aromatic ring (a22), expressed by a molar ratio (a21)/(a22), is usually 5/95 to 70/30, preferably 8/92 to 70/30, and more preferably 10/95 to 70/30. A content ratio within this range affords excellent member staining property. If the (a21)/(a22) is greater than 70/30, the member staining property is impaired. Moreover, if the (a21)/(a22) is excessively small, the member staining property is impaired. Effects appear if (a21) and (a22) are copolymerized together moderately though the causes are unclear.

Examples of diols other than the alkylene glycol having three carbon atoms (a21) and the diol having an aromatic ring (a22) include alkylene glycols having 2 or 4 to 30 carbon atoms (for example, ethylene glycol, 1,4-butanediol, 1,6-hexanediol, octanediol, decanediol, dodecanediol, tetradecanediol, neopentyl glycol, and 2,2-diethyl-1,3-propanediol); alkylene ether glycols having a number average molecular weight (hereinafter abbreviated as Mn) of 106 to 10,000 (for example, diethylene glycol, triethylene glycol, dipropylene glycol, polyethylene glycol, polypropylene glycol, and polytetramethylene ether glycol); alicyclic diols having 6 to 24 carbon atoms (for example, 1,4-cyclohexanedimethanol and hydrogenated bisphenol A); alkylene oxide (an alkylene oxide is hereinafter abbreviated as AO) adducts having an Mn of 100 to 10,000 of the aforementioned alicyclic diols (the number of moles of addition: 2 to 100) [for example, an ethylene oxide (ethylene oxide is hereinafter abbreviated as EO) adduct, a propylene oxide (propylene oxide is hereinafter abbreviated as PO) adduct, and a butylene oxide (butylene oxide is hereinafter abbreviated as BO) adduct of 1,4-cyclohexanedimethanol]; polylactonediols having a weight average molecular weight (hereinafter abbreviated as Mw) of 100 to 5,000 (for example, poly-ε-caprolactonediol); and polybutadienediols having an Mw of 1,000 to 20,000.

Examples of said tri- to octa- or more-hydric polyol include tri- to octa- or more-hydric aliphatic alcohols having 3 to 10 carbon atoms (for example, glycerol, trimethylolethane, trimethylolpropane, pentaerythritol, sorbitan, and sorbitol); AO (the number of carbon atoms: 2 to 4) adducts (the number of moles of addition: 2 to 100) of trisphenols (the number of carbon atoms: 25 to 50) (for example, EO 2 to 4 mol adducts of trisphenol and PO 2 to 4 mol adducts of trisphenol PA); AO (the number of carbon atoms: 2 to 4) adducts (the number of moles of addition: 2 to 100) of novolac resins having the degree of polymerization of 3 to 50 (for example, phenol novolac and cresol novolac) (for example, PO 2 mol adduct of phenol novolac and EO 4 mol adduct of phenol novolac); AO (the number of carbon atoms: 2 to 4) adducts (the number of moles of addition: 2 to 100) of polyphenols having 6 to 30 carbon atoms (for example, pyrogallol, phloroglucinol, and 1,2,4-benzenetriol) (EO 4 mol adduct of pyrogallol); and acrylic polyols of a degree of polymerization of 20 to 2,000 {a copolymer of hydroxyethyl(meth)acrylate with another monomer having a polymerizable double bond [for example, styrene, (meth)acrylic acid, and (meth)acrylic acid esters], etc.}.

Preferred of these are aliphatic polyhydric alcohols and AO adducts of novolac resin, and more preferred are AO adducts of novolac resin.

The polyester resin (A) of the present invention has a polycarboxylic acid (a1) as a polycarboxylic acid component and a polyhydric alcohol (a2) as a polyhydric alcohol component as constitutional units and further has been esterified with a monocarboxylic acid (a3) and/or a monohydric alcohol (a4) at a part of the terminals thereof. From the viewpoint of heat-resistant storage property, the esterification at a terminal is preferably performed with a monocarboxylic acid (a3). In the polyester resin (A), the proportion of the terminals esterified is preferably 10 to 80% of all the terminals, more preferably 15 to 75%, and most preferably 25 to 65%.

Examples of the monocarboxylic acid (a3) include an aromatic monocarboxylic acid (a31), an aliphatic monocarboxylic acid (a32), and a modified form (a33) of (a31) or (a32). Regarding (a3), a single species thereof may be used or alternatively two or more species thereof may be used in combination.

Examples of the aromatic monocarboxylic acid (a31) include aromatic monocarboxylic acids having 7 to 36 carbon atoms and specifically include benzoic acid, vinylbenzoic acid, toluic acid, dimethylbenzoic acid, tert-butylbenzoic acid, cumic acid, naphthoic acid, biphenylmonocarboxylic acid, and furoic acid.

Examples of the aliphatic monocarboxylic acid (a32) include a chain saturated monocarboxylic acid (a321), a chain unsaturated monocarboxylic acid (a322), and an alicyclic monocarboxylic acid (a323).

Examples of the chain saturated monocarboxylic acid (a321) include straight chain or branched chain saturated monocarboxylic acids having 2 to 30 carbon atoms (acetic acid, propionic acid, butanoic acid, valeric acid, 2-ethylhexanoic acid, caproic acid, enanthic acid, caprylic acid, pelargonic acid, capric acid, lauric acid, myristic acid, pentadecylic acid, palmitic acid, margaric acid, stearic acid, tuberculostearic acid, arachidic acid, behenic acid, lignoceric acid, etc.).

Examples of the chain unsaturated monocarboxylic acid (a322) include straight chain or branched chain unsaturated monocarboxylic acids having 3 to 30 carbon atoms (acrylic acid, methacrylic acid, crotonic acid, cinnamic acid, palmitoleic acid, oleic acid, vaccenic acid, linoleic oil, α-linolenic acid, γ-linolenic acid, eleostearic acid, 8,11-eicosadienoic acid, 5,8,11-eicosatrienoic acid, arachidonic acid, stearidonic acid, eicosapentaenoic acid, docosapentaenoic acid, docosahexaenoic acid, dihomo-γ-linolenic acid, docosapentaenoic acid, elaidic acid, erucic acid, nervonic acid, etc.).

Examples of the alicyclic monocarboxylic acid (a323) include alicyclic monocarboxylic acids having 4 to 14 carbon atoms (cyclopropanecarboxylic acid, cyclobutanecarboxylic acid, cyclopentanecarboxylic acid, cyclohexanecarboxylic acid, cycloheptanecarboxylic acid, etc.).

Of monocarboxylic acids (a3), preferred from the viewpoint of low-temperature fixability and moisture heat-resistant storage stability is an aromatic monocarboxylic acid (a31), more preferred are benzoic acid, p-t-butylbenzoic acid, and naphthoic acid, and particularly preferred is benzoic acid.

Examples of the modified form (a33) of (a31) or (a32) include lower alkyl esters of (a31) or (a32).

Examples of the lower alkyl esters of (a31) or (a32) include methyl esters, ethyl esters, and isopropyl esters of (a31) or (a32).

Examples of the monohydric alcohol (a4) for esterifying the polyester resin (A) at a part of the terminals thereof include a monohydric aliphatic alcohol (a41) and a monohydric aromatic alcohol (a42). Regarding the (a4), a single species thereof may be used or alternatively two or more species thereof may be used in combination.

Examples of the aliphatic alcohol (a41) include a saturated alcohol (a411) and an unsaturated alcohol (a412).

Examples of the saturated alcohol (a411) include a straight chain or branched chain saturated alcohol having 1 to 30 carbon atoms (methanol, ethanol, 1-propyl alcohol, and isopropyl alcohol, butanol, pentanol, 2-methyl-1-butanol, 2,2-dimethyl-1-propanol, hexanol, 4-methyl-1-pentanol, 2,3-dimethyl-2-butanol, heptanol, 3-ethyl-3-pentanol, octanol, 2-ethyl-1-hexanol, nonanol, 2,6-dimethyl-4-heptanol, decanol, undecanol, lauryl alcohol, myristyl alcohol, cetyl alcohol, stearyl alcohol, etc.), and an adduct (the number of moles of addition: 1 to 20 mol) of an AO (EO, PO, and BO) having 2 to 4 carbon atoms to a straight chain or branched chain saturated alcohol having 1 to 30 carbon atoms.

Examples of the unsaturated alcohol (a412) include a straight chain or branched chain unsaturated alcohol having 2 to 30 carbon atoms (allyl alcohol, 2-buten-1-ol, 2-penten-1-ol, 2-hexen-1-ol, 2-hepten-1-ol, 2-octen-1-ol, 2-nonen-1-ol, 2-decen-1-ol, 2-dodecenol, palmitoleyl alcohol, oleyl alcohol, linoleyl alcohol, etc.), and an adduct (the number of moles of addition: 1 to 20 mol) of an AO (EO, PO, and BO) having 2 to 4 carbon atoms to a straight chain or branched chain unsaturated alcohol having 1 to 30 carbon atoms.

Examples of the aromatic alcohol (a42) include aromatic alcohols having 6 to 30 carbon atoms (phenol, ethylphenol, isobutylphenol, pentylphenol, octylphenol, dodecylphenol, tetradecylphenol, benzyl alcohol, etc.), and an adduct (the number of moles of addition: 1 to 20 mol) of an AO (EO, PO, and BO) having 2 to 4 carbon atoms to an aromatic alcohol having 6 to 30 carbon atoms.

The polyester resin (A) of the present invention may, according to necessity, have a structure in which a vinyl monomer (a5) is grafted.

Examples of the vinyl monomer (a5) include vinyl chloride, vinyl bromide, vinyl iodide, (a51) vinyl esters, such as vinyl acetate, vinyl propionate, vinyl formate, and vinyl caproate;

(a52) ethylenic monocarboxylic acids, such as acrylic acid and methacrylic acid;

(a53) ester of ethylenic monocarboxylic acids (a52) such as acrylic acid and methacrylic acid, such as methyl acrylate, ethyl acrylate, n-propyl acrylate, isopropyl acrylate, n-butyl acrylate, isobutyl acrylate, tert-butyl acrylate, amyl acrylate, cyclohexyl acrylate, n-octyl acrylate, isooctyl acrylate, decyl acrylate, lauryl acrylate, 2-ethylhexyl acrylate, stearyl acrylate, methoxyethyl acrylate, 2-hydroxyethyl acrylate, glycidyl acrylate, 2-chloro ethyl acrylate, phenyl acrylate, and methyl α-chloroacrylate; and methyl methacrylate, ethyl methacrylate, n-propyl methacrylate, isopropyl methacrylate, n-butyl methacrylate, isobutyl methacrylate, tert-butyl methacrylate, amyl methacrylate, cyclohexyl methacrylate, n-octyl methacrylate, isooctyl methacrylate, decyl methacrylate, lauryl methacrylate, 2-ethylhexyl methacrylate, stearyl methacrylate, methoxyethyl methacrylate, 2-hydroxyethyl methacrylate, glycidyl methacrylate, phenyl methacrylate, dimethylaminoethyl methacrylate, and diethylaminoethyl methacrylate;

(a54) ethylenic monocarboxylic acid derivatives, such as acrylonitrile, methacrylonitrile, and acrylamide; ethylenic dicarboxylic acids and derivatives thereof, such as dimethyl maleate; vinyl ketones, such as vinyl methyl ketone; vinyl ethers, such as vinyl ethyl ether; and vinylidene halides, such as vinylidene chloride.

The ratio of the polycarboxylic acid (a1) to the polyhydric alcohol (a2) in the polyester resin (A), expressed by the equivalent ratio [COOH]/[OH] of carboxyl groups [COOH] to hydroxy groups [OH], is preferably ½ to 1/0.9, more preferably 1/1.5 to 1/1, and particularly preferably 1/1.3 to 1/1.02.

From the viewpoint of attaining a combination of the durability and the low-temperature fixability of a toner, the Mn of the polyester resin (A) is preferably 500 to 4,000, more preferably 1,000 to 3,000, and particularly preferably 1,500 to 2,500.

The Mw of the polyester resin (A) is 1,000 to 8,000, and from the viewpoint of attaining a combination of the durability and the low-temperature fixability of a toner, it is preferably 2,000 to 6,500, and more preferably 3,000 to 5,500.

The Mn and the Mw of the resin (A) in the present invention can be measured under the following conditions using gel permeation chromatography (GPC).

Device (one example): "HLC-8120" [manufactured by TOSOH Corporation]

Column (one example): "TSK GEL GMH6" [manufactured by Tosoh Corporation], two columns Measurement temperature: 40° C.

Sample solution: 0.25% by weight solution in tetrahydrofuran (filtrate obtained by filtering off insolubles with a glass filter)

Solution injection amount: 100 µl

Detecting device: refractive index detector

Standard substance: standard polystyrene (TSK standard POLYSTYRENE) 12 items (molecular weight: 500, 1,050, 2,800, 5,970, 9,100, 18,100, 37,900, 96,400, 190,000, 355,000, 1,090,000, 2,890,000) [produced by TOSOH Corporation]

The ester group concentration of the polyester resin (A) based on the weight of the (A) is 16 to 30% by weight, and from the viewpoints of heat-resistant storage stability and moisture heat-resistant storage stability, it is preferably 18 to 29% by weight, more preferably 20 to 28% by weight, and particularly preferably 25 to 28% by weight.

The ester group concentration is a value which can be calculated from the number of the ester groups [—C(=O)O—] in the (A) and is specifically represented by formula (3).

$$\text{Ester group concentration (unit: \%)} = [(N \times 44)/\text{number average molecular weight}] \times 100 \qquad \text{Formula (3)}$$

Here, N is the average of the number of ester groups of the polyester resin (A) per molecule, and 44 is the formula weight of an ester group [—C(=O)O—].

In calculating an ester group concentration, there are a method of calculating it by determining the monomer composition constituting the (A) and the number of ester groups by nuclear magnetic resonance spectroscopy (NMR), and a method of calculating it by determining the number of ester groups from the quantity ratio of the raw materials used for the preparation of the (A).

The polyester resin (A) is required to satisfy the above [Condition 1] based on an empirical formula.

From the viewpoint of heat-resistant storage stability and moisture heat-resistant storage stability, it preferably satisfies the following [Condition 2] and more preferably satisfies the following [Condition 3].

$$229 \times (\text{ECON}) + 90 \times (\text{OHV}) \leq 10{,}000 \qquad \text{[Condition 2]}$$

$$229 \times (\text{ECON}) + 90 \times (\text{OHV}) \leq 8{,}500 \qquad \text{[Condition 3]}$$

From the viewpoint of heat-resistant storage property and moisture heat-resistant storage stability, the hydroxy value of the polyester resin (A) is usually 1 to 30 mgKOH/g, preferably 2 to 25 mgKOH/g, and more preferably 5 to 20 mgKOH/g.

From the viewpoint of moisture heat-resistant storage stability, the acid value of the polyester resin (A) is usually 40 mgKOH/g or less, preferably 0 to 30 mgKOH/g, more preferably 1 to 25 mgKOH/g, and particularly preferably 2 to 20 mgKOH/g.

The hydroxy value and the acid value of the (A) can be measured by the method of JIS K0070-1992.

From moisture heat-resistant storage stability, the amount of water remaining in the (A) after storing the polyester resin (A) under conditions of 40° C. and a relative humidity of 80% for 20 hours (moisture heat resistance test) is preferably 12,000 ppm or less based on the weight of the (A), more preferably 10,000 ppm or less, and particularly preferably 8,500 ppm or less.

The absolute value of the difference between the ½ falling temperature (T1) of the polyester (A) measured with a flow tester after subjecting the (A) to storage under conditions of 40° C. and a relative humidity of 80% for 20 hours (a moisture heat resistance test) and the ½ falling temperature (T0) of the (A) measured with a flow tester before subjecting the (A) to the moisture heat resistance test is preferably 8° C. or less, more preferably 7° C. or less, and particularly preferably 6° C. or less, from the viewpoint of moisture heat-resistant storage stability.

The ½ falling temperature measured with a flow tester is a temperature at which half of a measurement sample flows out during extrusion of 1 g of the measured resin with the flow tester at a temperature ramp-up rate of 6° C./min and a load of 1.96 MPa through a nozzle having a diameter of 1 mm and a length of 1 mm. The "½ falling temperature" of the polyester resin (A) measured with a flow tester is measured as follows using a Koka-type flow tester [for example, "CFT-500D" manufactured by Shimadzu Corporation].

A temperature at which half (0.5 g) of the measurement sample flows out during extrusion of 1 g of a polyester resin (A) through a nozzle having a diameter of 1 mm and a length of 1 mm under application of a load of 1.96 MPa with a plunger while heating the (A) at a temperature ramp-up rate of 6° C./min is defined as a ½ falling temperature measured with a flow tester. Specifically, a graph is drawn with axes of "temperature" and "the amount of plunger falling (flow value)", and a temperature corresponding to ½ of the maximum of the amount of plunger falling is read from the graph.

From the viewpoints of the low-temperature fixability, the heat-resistant storage stability, and the moisture heat-resistant storage stability under a high humidity/high temperature environment, the glass transition temperature (hereinafter abbreviated as Tg) of the polyester resin (A) is preferably 40 to 80° C., more preferably 40 to 70° C., and particularly preferably 40 to 60° C. Tg can be measured by the method (DSC) specified in ASTM D3418-82 by using "DSC20, SSC/580" [manufactured by Seiko Instruments Inc.], for example.

The polyester resin (A) of the present invention can be produced by a method known in the art. Specifically, it can be produced by polycondensing a polycarboxylic acid (a1), a polyhydric alcohol (a2), and a monocarboxylic acid (a3) and/or a monohydric alcohol (a4). In this procedure, all the components may be polycondensed simultaneously, or alternatively the resin may be produced via a plurality of separate polycondensation reactions, for example, by adding, to a polyester resin produced from some of the raw materials, the remaining raw materials and further performing polycondensation.

The production of the toner binder of the present invention may include, after obtaining a polyester resin (A) by polycondensing a polycarboxylic acid (a1) and a polyhydric alcohol (a2), a step of removing the polyhydric alcohol (a2) contained in the polyester resin (A). The inclusion of the step of removing the polyhydric alcohol (a2) contained in the polyester resin (A) improves the low-temperature fixability, the heat-resistant storage stability, and the moisture heat-resistant storage stability of the resulting toner binder.

The step of removing the polyhydric alcohol (a2) contained in the polyester resin (A) may be a method of removing it by reducing pressure. The pressure to be used during the removal by pressure reduction is preferably 0.001 to 0.050 MPa, more preferably 0.002 to 0.040 MPa, and particularly preferably 0.003 to 0.020 MPa.

In the removal of the polyhydric alcohol (a2) by pressure reduction, it maybe removed under heating, and the temperature is preferably 100 to 270° C., more preferably 150 to 260° C., and particularly preferably 170 to 250° C.

In the polycondensation, the reaction temperature is preferably 100 to 250° C., the reaction pressure is preferably 0.001 to 0.2 MPa, and the reaction time is preferably 1 to 50 hours.

Preferably, the polycondensation is performed while removing water produced out of the reaction system in order to increase the reaction rate.

Preferably, a catalyst is used in order to promote a reaction. Examples of the catalyst include inorganic acids (for example, sulfuric acid and hydrochloric acid), organic sulfonic acids (for example, methanesulfonic acid, paratoluene sulfonic acid, xylenesulfonic acid, and naphthalenesulfonic acid), and organometallic compounds (for example, dibutyltin oxide, tetraisopropoxy titanate, bistriethanolamine titanate, and potassium oxalate titanate). When a catalyst is used, the catalyst may be neutralized, and then removed and refined by treatment with an absorbent after the completion of the esterification reaction, if necessary.

The toner binder of the present invention may comprise a resin (B) other than the polyester resin (A) of the present invention. Examples of such a resin (B) include a polyester resin (B1), a polyurethane resin (B2), a polyurea resin (B3), a vinyl resin (B4), and an epoxy resin (B5).

Examples of the polyester resin (B1) include a polyester resin comprising a polycarboxylic acid (a1) and a polyalcohol (a2) as constitutional units, wherein the ester group concentration is not within the range of 16 to 30% by weight or wherein the above-described condition 1 is not fulfilled.

Examples of the polyurethane resin (B2) include resins comprising a polyhydric alcohol such as the polyhydric alcohol (a2) stated above or a polyester resin terminated with a hydroxy group, a diisocyanate (c), and, if necessary, a diamine (b) as constitutional units.

Examples of the diamine (b) include aliphatic diamines having 2 to 18 carbon atoms (b1) and aromatic diamines having 6 to 20 carbon atoms (b2).

Examples of the aliphatic diamines having 2 to 18 carbon atoms (b1) include linear aliphatic diamines (b11) and cyclic aliphatic diamines (b12).

Examples of the linear aliphatic diamines (b11) include alkylenediamines having 2 to 12 carbon atoms (for example, ethylenediamine, propylenediamine, trimethylenediamine, tetramethylenediamine, and hexamethylenediamine).

Examples of the cyclic aliphatic diamines (b12) include alicyclic diamines having 4 to 15 carbon atoms {for example, 1,3-diaminocyclohexane, isophoronediamine, menthenediamine, 4,4'-methylenedicyclohexanediamine (hydrogenated methylenedianiline), and 3,9-bis(3-aminopropyl)-2,4,8,10-tetraoxaspiro[5,5]undecane}

Examples of the aromatic diamines having 6 to 20 carbon atoms (b2) include 1,2-, 1,3- or 1,4-phenylenediamine, 2,4'- or 4,4'-diphenylmethanediamine, diaminodiphenylsulfone, benzidine, thiodianiline, bis(3,4-diaminophenyl)sulfone, 2, 6-diaminopyridine, m-aminobenzylamine, naphthylenediamine, 2,4- or 2,6-tolylenediamine, crude tolylenediamine, diethyltolylenediamine, 4,4'-diamino-3,3'-dimethyldiphenylmethane, 4,4'-bis(o-toluidine), dianisidine, diaminoditolylsulfone, 1,3-dimethyl-2,4-diaminobenzene, 1,3-diethyl-2,4-diaminobenzene, 1,3-dimethyl-2,6-diaminobenzene, 1,4-diethyl-2,5-diaminobenzene, 1,4-diisopropyl-2,5-diaminobenzene, 1,4-dibutyl-2,5-diaminobenzene, 2,4-diaminomesitylene, 1,3,5-triethyl-2,4-diaminobenzene, 1,3,5-triisopropyl-2,4-diaminobenzene, 1-methyl-3,5-diethyl-2,4-diaminobenzene, 1-methyl 3,5-diethyl 2,6-diamino benzene, 2,3-dimethyl-1,4-diamino naphthalene, 2,6-dimethyl-1,5-diaminonaphthalene, 2,6-diisopropyl-1,5-diaminonaphthalene, 2,6-dibutyl-1,5-diaminonaphthalene, 3,3',5,5'-tetramethylbenzidine, 3,3',5,5'-tetraisopropylbenzidine, 3,3',5,5'-tetramethyl-4,4'-diaminodiphenylmethane, 3,3',5,5'-tetraethyl-4,4'-diaminodiphenylmethane, 3,3',5,5'-tetraisopropyl-4,4'-diaminodiphenylmethane, 3,3',5,5'-tetrabuthyl-4,4'-diaminodiphenylmethane, 3,5-diethyl-3'-methyl-2',4-diaminodiphenylmethane, 3,5-diisopropyl-3'-methyl-2',4-diaminodiphenylmethane, 3,3'-diethyl-2,2'-diaminodiphenylmethane, 4,4'-diamino-3,3'-dimethyldiphenylmethane, 3,3',5,5'-tetraethyl-4,4'-diaminobenzophenone, 3,3',5,5'-tetraisopropyl-4,4'-diaminobenzophenone, 3,3',5,5'-tetraethyl-4,4'-diaminodiphenyl ether, 3,3',5,5'-tetraisopropyl-4,4'-diaminodiphenylsulfone, and mixtures thereof.

Examples of the diisocyanate (c) include (c1) aromatic diisocyanates having 6 to 20 carbon atoms (excluding the carbon atoms in the NCO groups; the same applies hereinafter), (c2) aliphatic diisocyanates having 2 to 18 carbon atoms, (c3) modified products of these diisocyanates (for example, urethane group-, carbodiimide group-, allophanate group-, urea group-, biuret group-, uretdione group-, uretimine group-, isocyanurate group-, and oxazolidone group-containing modified products), and mixtures of two or more of these.

Examples of the aromatic diisocyanates (c1) include 1,3- or 1,4-phenylene diisocyanate, 2,4- or 2,6-tolylene diisocyanate (TDI), crude TDI, m- or p-xylylene diisocyanate (XDI), α,α,α',α'-tetramethylxylylene diisocyanate (TMXDI), 2,4'- or 4,4'-diphenylmethane diisocyanate (MDI), crude MDI {crude diaminophenylmethane [a condensate made up of formamide and an aromatic amine (aniline) or a mixture of aromatic amines, and mixtures thereof]}.

Examples of the aliphatic diisocyanates (c2) include linear aliphatic diisocyanates (c21) and cyclic aliphatic diisocyanates (c22).

Examples of the linear aliphatic diisocyanates (c21) include ethylene diisocyanate, tetramethylene diisocyanate, hexamethylene diisocyanate (HDI), dodecamethylene diisocyanate, 2,2,4-trimethylhexamethylene diisocyanate, lysine diisocyanate, 2,6-diisocyanato methylcaproate, bis(2-isocyanatoethyl)fumarate, bis(2-isocyanatoethyl)carbonate, and mixtures thereof.

Examples of the cyclic aliphatic diisocyanates (c22) include isophorone diisocyanate (IPDI), dicyclohexylmethane-4,4'-diisocyanate (hydrogenated MDI), cyclohexylene diisocyanate, methylcyclohexylene diisocyanate (hydrogenated TDI), bis(2-isocyanatoethyl)-4-cyclohexene-1,2-dicarboxylate, 2,5- or 2,6-norbornane diisocyanate, and mixtures thereof.

Examples of (c3) modified products of diisocyanates to be used include modified products containing a urethane group, a carbodiimide group, an allophanate group, a urea group, a biuret group, a uretdione group, a uretimine group, an isocyanurate group and/or an oxazolidone group, and specific examples thereof include modified MDI (for example, urethane-modified MDI, carbodiimide-modified MDI, and trihydrocarbyl phosphate-modified MDI), urethane-modified TDI, and mixtures thereof [for example, a mixture of a modified MDI and a urethane-modified TDI (an isocyanate-containing prepolymer)].

Of the diisocyanates (c), aromatic diisocyanates having 6 to 15 carbon atoms and aliphatic diisocyanates having 4 to 15 carbon atoms are preferred, and TDI, MDI, HDI, hydrogenated MDI, and IPDI are more preferred.

Examples of the polyurea resin (B3) include ones comprising the above-described diamine (b) and the above-described diisocyanate (c) as constitutional units.

Examples of the vinyl resin (B4) include polymers prepared by homopolymerizing or copolymerizing a monomer or monomers having a polymerizable double bond. Examples of the monomer having a polymerizable double bond include the following (d) to (k) and (m).

(d) Hydrocarbon monomers having a polymerizable double bond:

Examples thereof include the following (d1) aliphatic hydrocarbon monomer having a polymerizable double bond and (d2) aromatic hydrocarbon monomers having a polymerizable double bond.

(d1) Aliphatic hydrocarbon monomers having a polymerizable double bond:

(d11) Linear hydrocarbon monomer having a polymerizable double bond:

alkenes having 2 to 30 carbon atoms (for example, ethylene, propylene, butene, isobutylene, pentene, heptene, diisobutylene, octene, dodecene, and octadecene); and alkadienes having 4 to 30 carbon atoms (for example, butadiene, isoprene, 1,4-pentadiene, 1,5-hexadiene, and 1,7-octadiene).

(d12) Cyclic hydrocarbon monomers having a polymerizable double bond:

monocycloalkenes and dicycloalkenes having 6 to 30 carbon atoms (for example, cyclohexene, vinylcyclohexene, and ethylidenebicycloheptene); and monocycloalkadienes and dicycloalkadienes having 5 to 30 carbon atoms (for example, cyclopentadiene and dicyclopentadiene), etc.

(d2) Aromatic hydrocarbon monomers having a polymerizable double bond:

styrene; substituted styrenes (for example, α-methylstyrene, vinyltoluene, 2,4-dimethylstyrene, ethylstyrene, isopropylstyrene, butylstyrene, phenylstyrene, cyclohexylstyrene, benzylstyrene, crotylbenzene, divinylbenzene, divinyltoluene, divinylxylene, and trivinylbenzene); vinylnaphthalene, etc.

(e) Monomers having a carboxyl group and a polymerizable double bond, and their salts:

(e1) unsaturated monocarboxylic acids having 3 to 15 carbon atoms:

(meth)acrylic acid [the expression "(meth)acrylic" means acrylic or methacrylic], crotonic acid, isocrotonic acid, cinnamic acid, etc.

(e2) unsaturated dicarboxylic acids having 3 to 30 carbon atoms and their anhydrides:

maleic acid (maleic anhydride), fumaric acid, itaconic acid, citraconic acid (citraconic anhydride), mesaconic acid, etc.

(e3) Monoalkyl (having 1 to 10 carbon atoms) esters of unsaturated dicarboxylic acids having 3 to 10 carbon atoms:

monomethyl maleate, monodecyl maleate, monoethyl fumarate, monobutyl itaconate, monodecyl citraconate, etc.

Examples of the salts that constitute the salts of monomers having a carboxyl group and a polymerizable double bond include alkali metal salts (sodium salts, potassium salts, etc.), alkaline earth metal salts (calcium salts, magnesium salts, etc.), ammonium salts, amine salts, and quaternary ammonium salts.

The amine salts are not particularly limited as long as they are amine compounds and examples thereof include primary amine salts (ethylamine salts, butylamine salts, octylamine salts, etc.), secondary amines (diethylamine salts, dibutylamine salts, etc.), tertiary amines (triethylamine salts, tributylamine salts, etc.).

Examples of the quaternary ammonium salts include tetraethylammonium salts, triethyllaurylammonium salts, tetrabutylammonium salts, and tributyllaurylammonium salts.

Examples of the salts of monomers having a carboxyl group and a polymerizable double bond include sodium acrylate, sodium methacrylate, monosodium maleate, disodium maleate, potassium acrylate, potassium methacrylate, monopotassium maleate, lithium acrylate, cesium acrylate, ammonium acrylate, calcium acrylate, and aluminum acrylate.

(f) Monomers having a sulfo group and a polymerizable double bond, and their salts:

(f1) alkene sulfonic acids having 2 to 14 carbon atoms:
vinylsulfonic acid, (meth)allylsulfonic acid, methylvinylsulfonic acid, etc.

(f2) Styrene sulfonic acids:
α-methylstyrene sulfonic acid and alkyl (having 2 to 24 carbon atom) derivatives thereof (f3) Sulfo(hydroxy)alkyl(meth)acrylate having 5 to 18 carbon atoms:
sulfopropyl(meth)acrylate, 2-hydroxy-3-(meth)acryloxypropane sulfonate, 2-(meth)acryloyloxyethanesulfonic acid, 3-(meth)acryloyloxy-2-hydroxypropanesulfonic acid, etc.

(f4) Sulfo(hydroxy)alkyl(meth)acrylic amide having 5 to 18 carbon atoms:
2-(meth)acryloylamino-2,2-dimethylethanesulfonic acid, 2-(meth)acrylamido-2-methylpropanesulfonic acid, 3-(meth)acrylamido-2-hydroxypropanesulfonic acid, etc.

(f5) Alkyl (having 3 to 18 carbon atoms) allylsulfosuccinic acid:
propylallylsulfosuccinic acid, butylallylsulfosuccinic acid, 2-ethylhexyl-allylsulfosuccinic acid, etc.

(f6) Sulfuric acid esters of polyoxyalkylene (for example, oxyethylene, oxypropylene, and oxybutylene [the degree of polymerization n=2 to 30]; oxyalkylene may be used alone or in combination; when used in combination, the addition system may be either random addition or block addition) mono(meth)acrylates:
poly (the degree of polymerization n=5 to 15) oxyethylene monomethacrylate sulfate, poly(the degree of polymerization n=5 to 15)oxypropylene monomethacrylate sulfate, etc.

(f7) Compounds represented by the following formulae (1) to (3), and salts thereof:
Examples of the salts include those provided as examples of the salts that form (e) salts of monomers having a carboxyl group and a polymerizable double bond.

[Chemical Formula 1]

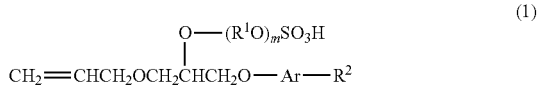

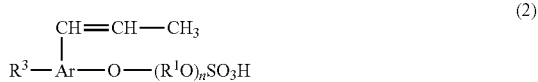

(3)

In the formulae (1) to (3), $R^1$ is an alkylene group having 2 to 4 carbon atoms; $R^1Os$ may be either of a single kind or of a combination of two or more kinds, and when two or more kinds of $R^1Os$ are used in combination, the bonding mode may be either random or block; $R^2$ and $R^3$ each independently represent an alkyl group having 1 to 15 carbon atoms; m and n each independently represent a number of 1 to 50; Ar represents a benzene ring; and $R^4$ represents an alkyl group having 1 to 15 carbon atoms optionally substituted with a fluorine atom.

(g) Monomers having a phosphono group and a polymerizable double bond, and their salts:
(g1) monoesters of (meth)acryloyloxyalkylphosphonic acids (the alkyl group has 1 to 24 carbon atoms)
2-hydroxyethyl(meth)acryloylphosphate, phenyl 2-acryloyloxyethylphosphate, etc.
(g2) (meth)acryloyloxyalkylphosphonic acids (the alkyl group has 1 to 24 carbon atoms)
2-acryloyloxyethylphosphonic acid, etc.
Examples of the salts include those provided as examples of the salts that form (e) monomers having a carboxyl group and a polymerizable double bond.

(h) Monomers having a hydroxyl group and a polymerizable double bond:
hydroxystyrene, N-methylol(meth)acrylamide, hydroxyethyl(meth)acrylate, hydroxypropyl(meth)acrylate, polyethylene glycol mono(meth)acrylate, (meth)allyl alcohol, crotyl alcohol, isocrotyl alcohol, 1-buten-3-ol, 2-buten-1-ol, 2-butene-1,4-diol, propargyl alcohol, 2-hydroxyethyl propenyl ether, sucrose allyl ether, etc.

(i) Nitrogen-containing monomers having a polymerizable double bond:
(i1) Monomers having an amino group and a polymerizable double bond:
aminoethyl(meth)acrylate, dimethylaminoethyl(meth)acrylate, diethylaminoethyl(meth)acrylate, tert-butylaminoethyl methacrylate, N-aminoethyl(meth)acrylamide, (meth)allylamine, morpholinoethyl (meth)acrylate, 4-vinylpyridine, 2-vinylpyridine, crotylamine, N,N-dimethylaminostyrene, methyl-α-acetaminoacrylate, vinylimidazole, N-vinylpyrrole, N-vinylthiopyrrolidone, N-arylphenylenediamine, aminocarbazole, aminothiazole, aminoindole, aminopyrrole, aminoimidazole, aminomercaptothiazole, salts thereof, etc.
(i2) Monomers having an amide group and a polymerizable double bond:
(meth)acrylamide, N-methyl(meth)acrylamide, N-butylacrylamide, diacetone acrylamide, N-methylol(meth)acrylamide, N,N'-methylene-bis(meth)acrylamide, cinnamide, N,N-dimethylacrylamide, N,N-dibenzylacrylamide, methacrylformamide, N-methyl-N-vinylacetamide, N-vinylpyrrolidone, etc.
(i3) Monomers having 3 to 10 carbon atoms and having a nitrile group and a polymerizable double bond:
(meth)acrylonitrile, cyanostyrene, cyanoacrylate, etc.
(i4) Monomers having 8 to 12 carbon atoms and having a nitro group and a polymerizable double bond:
nitrostyrene, etc.
(j) Monomers having 6 to 18 carbon atoms and having an epoxy group and a polymerizable double bond:
glycidyl(meth)acrylate, p-vinylphenylphenyl oxide, etc.

(k) Monomers having 2 to 16 carbon atoms and having a halogen element and a polymerizable double bond:
vinyl chloride, vinyl bromide, vinylidene chloride, allyl chloride, chlorostyrene, bromostyrene, dichlorostyrene, chloromethylstyrene, tetrafluorostyrene, chloroprene, etc.

(m) Esters having a polymerizable double bond, ethers having a polymerizable double bond, ketones having a polymerizable double bond, and sulfur-containing compounds having a polymerizable double bond:
(m1) Esters having 4 to 16 carbon atoms and having a polymerizable double bond:
vinyl acetate, vinyl propionate, vinyl butyrate, diallyl phthalate, diallyl adipate, isopropenyl acetate, vinyl methacrylate, methyl-4-vinyl benzoate, cyclohexyl methacrylate, benzyl methacrylate, phenyl(meth)acrylate, vinyl methoxyacetate, vinyl benzoate, ethyl-α-ethoxyacrylate;
alkyl(meth)acrylates having an alkyl group having 1 to 50 carbon atoms [methyl(meth)acrylate, ethyl(meth)acrylate, propyl(meth)acrylate, butyl(meth)acrylate, 2-ethylhexyl (meth)acrylate, dodecyl(meth)acrylate, hexadecyl (meth)acrylate, heptadecyl(meth)acrylate, eicosyl (meth)acrylate, etc.];
dialkyl fumarates (the two alkyl groups are linear, branched, or alicyclic groups having 2 to 8 carbon atoms);
dialkyl maleates (the two alkyl groups are linear, branched, or alicyclic groups having 2 to 8 carbon atoms);
poly(meth)allyloxyalkanes (diallyloxyethane, triallyloxyethane, tetraallyloxyethane, tetraallyloxypropane, tetraallyloxybutane, tetramethallyloxyethane, etc.);
monomers having a polyalkylene glycol chain and a polymerizable double bond [polyethylene glycol (Mn=300) mono(meth)acrylate, polypropylene glycol (Mn=500) monoacrylate, methanol 10 mol EO adduct (meth)acrylate, lauryl alcohol 30 mol EO adduct (meth)acrylate, etc.];
poly(meth)acrylates [poly(meth)acrylates of polyhydric alcohols: ethylene glycol di(meth)acrylate, propylene glycol di(meth)acrylate, neopentyl glycol di(meth)acrylate, trimethylolpropane tri(meth)acrylate, polyethylene glycol di(meth)acrylate, etc.].

(m2) Ethers having 3 to 16 carbon atoms and having a polymerizable double bond:
Vinyl methyl ether, vinyl ethyl ether, vinyl propyl ether, vinyl butyl ether, vinyl-2-ethyl hexyl ether, vinyl phenyl ether, vinyl-2-methoxyethyl ether, methoxybutadiene, vinyl-2-butoxyethyl ether, 3,4-dihydro-1,2-pyrane, 2-butoxy-2'-vinyloxydiethyl ether, acetoxystyrene, and phenoxystyrene are provided as examples.

(m3) Ketones having 4 to 12 carbon atoms and having a polymerizable double bond:
Vinyl methyl ketone, vinyl ethyl ketone, and vinyl phenyl ketone are provided as examples.

(m4) Sulfur-containing compounds having 2 to 16 carbon atoms and having a polymerizable double bond:
Divinyl sulfide, p-vinyldiphenyl sulfide, vinylethyl sulfide, vinyl ethyl sulfone, divinyl sulfone, and divinyl sulfoxide are provided as examples.

Examples of the epoxy resin (B5) include a ring-opening polymerization product of a polyepoxide (n) and a polyaddition product of a polyepoxide (n) and an active hydrogen-containing compound. Examples of the active hydrogen-containing compound include water, the aforementioned diol, a dicarboxylic acid (a11), and a diamine (b).

Examples of the polyepoxide (n) include aromatic polyepoxy compounds (n1), heterocyclic polyepoxy compounds (n2), alicyclic polyepoxy compounds (n3), and aliphatic polyepoxy compounds (n4).

Examples of the aromatic polyepoxy compounds (n1) include glycidyl ethers (n11) and glycidyl esters (n12) of polyhydric phenols, glycidyl aromatic polyamines (n13), and glycidylated products (n14) of aminophenol.

Examples of the glycidyl ethers (n11) of polyhydric phenols include bisphenol F diglycidyl ether, bisphenol A diglycidyl ether, bisphenol B diglycidyl ether, bisphenol AD diglycidyl ether, bisphenol S diglycidyl ether, halogenated bisphenol A diglycidyl, tetrachlorobisphenol A diglycidyl ether, catechin diglycidyl ether, resorcinol diglycidyl ether, hydroquinone diglycidyl ether, pyrogallol triglycidyl ether, 1,5-dihydroxynaphthalene diglycidyl ether, dihydroxybiphenyl diglycidyl ether, octachloro-4,4'-dihydroxybiphenyl diglycidyl ether, tetramethylbiphenyl diglycidyl ether, dihydroxynaphthylcresol triglycidyl ether, tris(hydroxyphenyl)methane triglycidyl ether, dinaphthyltriol triglycidyl ether, tetrakis(4-hydroxyphenyl)ethane tetraglycidyl ether, p-glycidylphenyldimethyltolylbisphenol A glycidyl ether, trismethyl-tert-butyl-butylhydroxymethane triglycidyl ether, 9,9'-bis(4-hydroxyphenyl)fluorene diglycidyl ether, 4,4'-oxybis(1,4-phenylethyl)tetracresol glycidyl ether, 4,4'-oxybis(1,4-phenylethyl)phenyl glycidyl ether, bis(dihydroxynaphthalene)tetraglycidyl ether, glycidyl ether of phenol or cresol novolac resin, glycidyl ether of limonene phenol novolac resin, diglycidyl ether obtained by the reaction between 2 mol of bisphenol A and 3 mol of epichlorohydrin, polyglycidyl ethers of polyphenols obtained by condensation reaction of phenol with glyoxal, glutaraldehyde, or formaldehyde, polyglycidyl ether of polyphenol obtained by condensation reaction of resorcin with acetone, etc.

Examples of the glycidyl esters (n12) of polyhydric phenols include phthalic acid diglycidyl ester, isophthalic acid diglycidyl ester, and terephthalic acid diglycidyl ester.

Examples of the glycidyl aromatic polyamines (n13) include N,N-diglycidylaniline, N,N,N',N'-tetraglycidyl xylylene diamine and N,N,N',N'-tetraglycidyldiphenylmethane diamine. Examples of the aromatic polyepoxy compounds also include diglycidyl urethane compounds obtained by addition reaction of tolylene diisocyanate or diphenylmethane diisocyanate with glycidol, glycidyl group-containing polyurethane (pre)) polymers obtained by causing polyols to react in addition to the preceding two reactants, and diglycidyl ethers of AO adducts of bisphenol A.

Examples of the heterocyclic polyepoxy compounds (n2) include trisglycidyl melamine.

Examples of the alicyclic polyepoxy compounds (n3) include vinylcyclohexane dioxide, limonene dioxide, dicyclopentadiene dioxide, bis(2,3-epoxycyclopentyl)ether, ethylene glycol bisepoxydicyclopentyl ether, 3,4-epoxy-6-methylcyclohexylmethyl-3',4'-epoxy-6'-methylcyclohexane carboxylate, bis(3,4-epoxy-6-methylcyclohexylmethyl)adipate, bis(3,4-epoxy-6-methylcyclohexylmethyl)butylamine, and dimeric acid diglycidyl ester.

Examples of the alicyclics further include nuclear-hydrogenated forms of the above-described aromatic polyepoxy compounds.

The aliphatic polyepoxy compounds (n4) include polyglycidyl ethers (n41) of polyhydric aliphatic alcohols, polyglycidyl esters (n42) of polyhydric fatty acids, and glycidyl aliphatic amines (n43).

Examples of the polyglycidyl ethers of polyhydric aliphatic alcohols (n41) include ethylene glycol diglycidyl ether, propylene glycol diglycidyl ether, tetramethylene glycol diglycidyl ether, 1,6-hexanediol diglycidyl ether, polyethylene glycol diglycidyl ether, polypropylene glycol diglycidyl ether, polytetramethylene glycol diglycidyl ether, neopentyl glycol diglycidyl ether, trimethylolpropane polyglycidyl ether, glycerol polyglycidyl ether, pentaerythritol polyglycidyl ether, sorbitol polyglycidyl ether, and polyglycerol polyglycidyl ether.

Examples of the polyglycidyl esters (n42) of polyhydric fatty acids include diglycidyl oxalate, diglycidyl malate, diglycidyl succinate, diglycidyl glutarate, diglycidyl adipate, and diglycidyl pimelate.

Examples of the glycidyl aliphatic amines (n43) include N,N,N',N'-tetraglycidylhexamethylenediamine. Examples of the aliphatics also include diglycidyl ethers and (co)polymers of glycidyl(meth)acrylate.

Preferred of the polyepoxides (n) are aromatic polyepoxy compounds (n1) and aliphatic polyepoxy compounds (n4). Polyepoxides may be used in a combination of two or more.

The resin (B) in the present invention may be one prepared from a precursor (B0) thereof. The precursor (B0) is not particularly limited as long as it can be converted into the resin (B) via a chemical reaction.

When the resin (B) is a polyester resin (B1), a polyurethane resin (B2), a polyurea resin (B3), or an epoxy resin (B5), the (B0) may be a combination of a prepolymer ($\alpha$) having a reactive group and a curing agent ($\beta$).

When the resin (B) is a vinyl resin (B4), examples of the (B0) include the monomers (d) to (k) and (m) described above.

Of precursors (B0), preferred from the viewpoint of productivity is a combination of a prepolymer ($\alpha$) having a reactive group and a curing agent ($\beta$).

When the combination of a prepolymer ($\alpha$) having a reactive group and a curing agent ($\beta$) is used as the precursor (B0), the reactive group which the prepolymer ($\alpha$) has refers to a group capable of reacting with the curing agent ($\beta$). In this case, example of the method of forming the (B) by reacting the precursor (B0) include a method of forming the (B) by reacting the ($\alpha$) with the ($\beta$) by heating.

Examples of the combination of the reactive group possessed by the prepolymer ($\alpha$) having a reactive group and the curing agent ($\beta$) include the following [1] and [2].

[1] A combination in which the reactive group possessed by the ($\alpha$) is a functional group ($\alpha1$) capable of reacting with an active hydrogen-containing compound and the ($\beta$) is an active hydrogen-containing compound ($\beta1$).

[2] A combination in which the reactive group possessed by the ($\alpha$) is an active hydrogen-containing group ($\alpha2$) and the ($\beta$) is a compound ($\beta2$) capable of reacting with an active hydrogen-containing group ($\alpha2$).

The active hydrogen-containing group ($\alpha2$) as referred to herein is a functional group having an active hydrogen.

In the combination [1], examples of the functional group ($\alpha1$) capable of reacting with an active hydrogen-containing compound include an isocyanate group ($\alpha11$), a blocked isocyanate group ($\alpha12$), an epoxy group ($\alpha13$), an acid anhydride group ($\alpha14$), and an acid halide group ($\alpha15$). Preferred of these are ($\alpha11$), ($\alpha12$), and ($\alpha13$), and the ($\alpha11$) and the ($\alpha12$) are more preferred.

The blocked isocyanate group ($\alpha12$) refers to an isocyanate group blocked with a blocking agent. Examples of the blocking agent include oximes (for example, acetoxime, methyl isobutyl ketoxime, diethyl ketoxime, cyclopentanone oxime, cyclohexanone oxime and methyl ethyl ketoxime), lactams (for example, γ-butyrolactam, ε-caprolactam, and γ-valerolactam), aliphatic alcohols having 1 to 20 carbon atoms (for example, ethanol, methanol, and octanol), phenols (for example, phenol, m-cresol, xylenol, and nonylphenol), active methylene compounds (for example, acetylacetone, ethyl malonate, and ethyl acetoacetate), basic nitrogen-containing compounds (for example, N,N-diethylhydroxylamine, 2-hydroxypiridine, pyridine N-oxide, and 2-mercaptopyridine), and mixtures of two or more of them.

Of these blocking agents, oximes are preferred, and methyl ethyl ketoxime is more preferred.

Examples the constitutional units of the reactive group-containing prepolymer (α) include polyether (αv), polyester (αw), epoxy resin (αx), polyurethane (αy), and polyurea (αz).

Examples of the polyether (αv) include polyethylene oxide, polypropylene oxide, and polybutylene oxide.

Examples of the polyester (αw) include polyester resin (A).

Examples of the epoxy resin (αx) include addition condensates of bisphenols (for example, bisphenol A, bisphenol F, and bisphenol S) with epichlorohydrin.

Examples of the polyurethane (αy) include polyaddition products of a polyalcohol (a2) with a diisocyanate (c), and polyaddition products of a polyester (αw) with a diisocyanate (c).

Examples of the polyurea (αz) include polyaddition products of a diamine (b) with a diisocyanate (c).

Examples of a method for making the polyether (αv), the polyester (αw), the epoxy resin (αx), the polyurethane (αy), the polyurea (αz), and the like contain a reactive group include:

[1] a method of having a reactive group of a constituent component remain at an end thereof by using one of two or more constituent components excessively; and

[2] a method of having a reactive group of a constituent component remain at an end thereof by using one of two or more constituent components excessively, and further reacting a compound capable of reacting with the remaining reactive group, thereby introducing another reactive group.

In the above method [1], a hydroxy group-containing polyester prepolymer, a carboxyl group-containing polyester prepolymer, an acid halide group-containing polyester prepolymer, a hydroxy group-containing epoxy resin prepolymer, an epoxy group-containing epoxy resin prepolymer, a hydroxy group-containing polyurethane prepolymer, an isocyanate group-containing polyurethane prepolymer, or the like can be obtained.

Regarding the proportions of the constituent components, in the case of a hydroxy group-containing polyester prepolymer, for example, the ratio of a polyol component to a polycarboxylic acid component, expressed by the equivalent ratio [OH]/[COOH] of the hydroxy groups [OH] to the carboxyl groups [COOH], is preferably 2/1 to 1/1, more preferably 1.5/1 to 1/1, and particularly preferably 1.3/1 to 1.02/1. Also in the case of a prepolymer having a different backbone or a different terminal group, only the constituent components vary but the ratio thereof is the same as described above.

In the above method [2], for example, an isocyanate group-containing prepolymer is obtained by reacting a polyisocyanate with the prepolymer obtained in the above method [1], and a blocked polyisocyanate group-containing prepolymer is obtained by reacting a blocked polyisocyanate with the prepolymer obtained in the above method [1]. On the other hand, an epoxy group-containing prepolymer is obtained by reacting a polyepoxide with the prepolymer obtained in the above method [1]. Moreover, an acid anhydride group-containing prepolymer is obtained by reacting a polyacid anhydride.

As to the amount of the compound containing a reactive group to be used, in the case of, for example, obtaining an isocyanate group-containing polyester prepolymer by reacting a polyisocyanate with a hydroxy group-containing polyester, the proportion of the polyisocyanate, expressed by the equivalent ratio [NCO]/[OH] of the isocyanate groups [NCO] to the hydroxy groups [OH] of the hydroxy group-containing polyester, is preferably from 5/1 to 1/1, more preferably from 4/1 to 1.2/1, and particularly preferably from 2.5/1 to 1.5/1. Also in the case of a prepolymer having a different backbone or a different terminal group, only the constituent components vary but the ratio thereof is the same as described above.

The number of reactive groups contained in the reactive group-containing prepolymer (α) per molecule is preferably one or more, more preferably 1.5 to 3 on average, and particularly preferably 1.8 to 2.5 on average. Within the above ranges, the molecular weight of the cured product obtained by causing the prepolymer to react with the curing agent (β) is increased.

The Mn of the reactive group-containing prepolymer (α) is preferably 500 to 30,000, more preferably 1,000 to 20,000, and particularly preferably 2,000 to 10,000.

The Mw of the reactive group-containing prepolymer (α) is preferably 1,000 to 50,000, more preferably 2,000 to 40,000, and particularly preferably 4,000 to 20,000.

Examples of the active hydrogen group-containing compound (β1) include a diamine (β11), a diol (β12), a dimercaptan (β13), which optionally have been blocked with an eliminable compound, and water. Of these, (β11), (β12) and water are preferred, (β11) and water are more preferred, and blocked polyamines and water are particularly preferred.

Examples of (β11) include the same compounds as listed for the diamine (b). Preferred as (β11) are 4,4'-diaminodiphenylmethane, xylylenediamine, isophoronediamine, ethylenediamine, diethylenetriamine, triethylenetetramine, and mixtures thereof. [0114]

Examples of the diol (β12) include the same compounds as listed for the diol (a21), and preferred ones are also the same.

Examples of the dimercaptan (β13) include ethanedithiol, 1,4-butanedithiol, and 1,6-hexanedithiol.

A reaction terminator (βs) may, if necessary, be used together with the active hydrogen-containing compound (β1). By using a certain proportion of the reaction terminator together with (β1), it is possible to adjust the (B) to have a prescribed molecular weight.

Examples of the reaction terminator (βs) include monoamines (for example, diethylamine, dibutylamine, butylamine, laurylamine, monoethanolamine, and diethanolamine); blocked monoamines (for example, ketimine compounds); monohydric alcohols (for example, methanol, ethanol, isopropanol, butanol, and phenol); monomercaptans (for example, butylmercaptan and laurylmercaptan); monoisocyanates (for example, laurylisocyanate and phenylisocyanate); and monoepoxides (for example, butyl glycidyl ether).

Examples of the active hydrogen-containing group (α2) possessed by the reactive group-containing prepolymer (α) in the above combination [2] include an amino group (α21), a hydroxy group (an alcoholic hydroxy group and a phenolic hydroxy group) (α22), a mercapto group (α23), a carboxyl group (α24), and organic groups (α25) obtained by blocking these groups with an eliminable compound. Preferred of these are (α21), (α22) and (α25), and (α22) is more preferred.

Examples of the organic group obtained by blocking an amino group with an eliminable compound include the same groups as listed for the above-described (β11).

Examples of the compound (β2) capable of reacting with an active hydrogen-containing group include a diisocyanate (β21), a diepoxide (β22), a polycarboxylic acid (β23), a polyacid anhydride (β24), and a polyacid halide (β25). Preferred of these are (β21) and (β22), and (β21) is more preferred.

Examples of the diisocyanate (β21) include the same compounds as listed for the diisocyanate (c), and preferred ones are also the same.

Examples of the diepoxide (β22) include aromatic diepoxy compounds and aliphatic diepoxy compounds. Examples of the aromatic diepoxy compounds include glycidyl ethers of polyhydric phenols, glycidyl esters of aromatic polycarboxylic acids, glycidyl aromatic polyamines, and glycidylated products of aminophenol.

Examples of the diepoxide (β22) include the same as listed for the diepoxide of the polyepoxide (n).

Examples of the dicarboxylic acid (β23) include the same compounds as listed for the dicarboxylic acid (a11), and preferred ones are also the same.

The proportion of the curing agent (β), expressed by the ratio [α]/[β] of the equivalent [α] of the reactive groups in the reactive group-containing prepolymer (α) to the equivalent of the active hydrogen-containing groups in the curing agent (β), is preferably from 1/2 to 2/1, more preferably from 1.5/1 to 1/1.5, and particularly preferably from 1. 2/1 to 1/1.2. When the curing agent (β) is water, the water is dealt with as a dihydric active hydrogen-containing compound.

From the viewpoints of low-temperature fixability and moisture heat-resistant storage stability, the content of the polyester resin (A) in the toner binder of the present invention based on the weight of the toner binder is preferably 20 to 99.9% by weight, more preferably 50 to 99.5% by weight, and particularly preferably 75 to 99% by weight.

The toner binder of the present invention can be obtained by mixing, if necessary, a resin (B) with the polyester resin (A). Examples of the method of mixing include a method of mixing, with an appropriate mixer (for example, a Henschel mixer), the polyester resin (A) and the resin (B) generally prepared in a pellet form or a powder form, and a method of further performing heating, melting and mixing with a kneading machine, according to necessity.

From the viewpoints of the low-temperature fixability and the moisture heat-resistant storage stability of a toner, the weight ratio [ (A)/(B) ] of the polyester resin (A) to the resin (B) is preferably 6/94 to 97/3, more preferably 20/80 to 95/5, and particularly preferably 35/65 to 90/10, based on the total weight of the (A) and the (B).

The toner of the present invention is a toner comprising the toner binder of the present invention, a colorant, and a mold release agent.

Any dyes, pigments, and the like used as colorants for toners may be used as the colorant. Specific examples thereof include carbon black, iron black, Sudan Black SM, Fast Yellow G, Benzidine Yellow, Solvent Yellow (21, 77, 114, etc.), Pigment Yellow (12, 14, 17, 83, etc.), Indofast Orange, Irgazin Red, paranitroaniline red, Toluidine Red, Solvent Red (17, 49, 128, 5, 13, 22, 48.2, etc.), Disperse Red, Carmine FB, Pigment Orange R, Lake Red 2G, Rhodamine FB, Rhodamine B Lake, Methyl Violet B Lake, phthalocyanine blue, Solvent Blue (25, 94, 60, 15.3, etc.), Pigment Blue, Brilliant Green, phthalocyanine green, Oil Yellow GG, Kayaset YG, Orasol Brown B, and Oil Pink OP, and these can be used singly or two or more of them can be used in mixture. According to necessity, magnetic powders (powders of ferromagnetic metals such as iron, cobalt and nickel, or such compounds as magnetite, hematite, and ferrite) maybe added for serving also as a colorant.

The content of the colorant is preferably 0 to 60% by weight, more preferably 0.1 to 55% by weight, and particularly preferably 0.5 to 50% by weight based on the weight of the toner .

As the mold release agent, one having a softening point of 50 to 170° C. is preferred, and examples thereof include polyolefin wax, natural wax (for example, carnauba wax, montan wax, paraffin wax, and rice wax), aliphatic alcohols having 30 to 50 carbon atoms (for example, triacontanol), fatty acids having 30 to 50 carbon atoms (for example, triacontane carboxylic acid), and mixtures thereof.

Examples of the polyolefin wax include (co)polymers of olefins (for example, ethylene, propylene, 1-butene, isobutylene, 1-hexene, 1-dodecene, 1-octadecene, and mixtures thereof) [including those obtained by (co)polymerization and thermo-degradation type polyolefins], products oxidized with oxygen and/or ozone of (co)polymers of olefins, maleic acid-modified ones of (co)polymers of olefins [for example, ones which have been modified with maleic acid and derivatives thereof (maleic anhydride, monomethyl maleate, monobutyl maleate, dimethyl maleate, etc.)], copolymers of olefins and unsaturated carboxylic acids [(meth)acrylic acid, itaconic acid, maleic anhydride, etc.] and/or unsaturated carboxylic acid alkyl esters [(meth)acrylic acid alkyl (alkyl group having 1 to 18 carbon atoms) esters and maleic acid alkyl (alkyl group having 1 to 18 carbon atoms) esters, etc.], and other hydrocarbon waxes (for example, Fischer Tropsch waxes such as sasol wax), fatty acid metal salts (calcium stearate, etc.), and fatty acid esters (behenyl behenate, etc.).

The content of the mold release agent is preferably 0 to 30% by weight, more preferably 0.5 to 20% by weight, and particularly preferably 1 to 10% by weight based on the weight of the toner.

The toner of the present invention may comprise, a charge control agent, a fluidizing agent, etc. as well as the toner binder, the colorant, the mold release agent.

Examples of the charge control agent include nigrosine dyes, triphenylmethane dyes containing a tertiary amine as a side chain, quaternary ammonium salts, polyamine resins, imidazole derivatives, quaternary ammonium salt group-containing polymers, metal-containing azo dyes, copper phthalocyanine dyes, salicylic acid metal salts, boron complexes of benzilic acid, sulfonic acid group-containing polymers, fluorine-containing polymers, halogen-substituted aromatic ring-containing polymers, metal complexes of alkyl derivatives of salicylic acid, and cetyltrimethylammonium bromide.

The content of the charge control agent is preferably 0 to 20% by weight, more preferably 0.1 to 10% by weight, and particularly preferably 0.5 to 7.5% by weight based on the weight of the toner.

Examples of the fluidizing agent include colloidal silica, alumina powder, titanium oxide powder, calcium carbonate powder, barium titanate, magnesium titanate, calcium titanate, strontium titanate, zinc oxide, quartz sand, clay, mica, wollastonite, diatom earth, chromium oxide, cerium oxide, rouge, antimony trioxide, magnesium oxide, zirconium oxide, barium sulfate, and barium carbonate.

The content of the fluidizing agent is preferably 0 to 10% by weight based on the weight of the toner.

The content of the toner binder of the present invention in the toner is preferably 30 to 97% by weight, more preferably 40 to 95% by weight, and particularly preferably 45 to 92% by weight based on the weight of the toner.

The toner can be used as a developer for an electrical latent image after, according to necessity, being mixed with carrier particles [for example, iron powder, glass beads, nickel powder, ferrite, magnetite, and ferrite with the surface thereof having been coated with resin (an acrylic resin, a silicone resin, etc.)]. An electrical latent image can be formed also by rubbing the resin particle with an electrifying blade instead of carrier particles, and the electric latent image is fixed to a support (paper, polyester film, etc.) by a hot roll fixing method known in the art, etc.

The volume average particle diameter of the toner is preferably 1 to 15 μm, more preferably 2 to 10 μm, and particularly preferably 3 to 7 μm. The volume average particle diameter of the toner can be measured by using a Coulter counter "Multisizer III" (manufactured by Beckman Coulter Inc.).

The method for producing the toner has no particular limitations, and the toner maybe one obtained by a method known in the art such as a kneading-pulverization method, an emulsion phase-inversion method, and a polymerization method. For example, in the case of obtaining a toner by a kneading-pulverization method, the toner can be produced by dry-blending components excluding a fluidizing agent which are to constitute the toner, melt-kneading them, then coarsely pulverizing, finally forming particulates by using a jet mill pulverizer or the like, further classifying into particulates preferably having a volume average particle diameter within the range of from 1 to 15 μm, and then mixing a fluidizing agent.

In the case where a toner is obtained by using a phase-inversion emulsion method, the toner can be produced by dissolving or dispersing components excluding a fluidizing agent which are to constitute the toner, in an organic solvent, then emulsifying them by, for example, adding water thereto, and separating and then classifying them. It may be produced by the method using organic particles disclosed in JP-A-2002-284881 or the method involving dispersion in supercritical carbon dioxide disclosed in JP-A-2007-277511.

EXAMPLES

The present invention is further described by examples below, but the invention is not limited thereto.

Example 1

Synthesis of Polyester Resin (A-1)

A reaction vessel equipped with a stirrer, a heating and cooling apparatus, a thermometer, a cooling tube, and a nitrogen introduction tube was charged with 423 parts by weight (66.0 molar parts with the exception of 259 parts by weight of the recovery described below) of 1,2-propanediol (boiling point: 188° C., hereinafter referred to simply as propylene glycol), 387 parts (34.0 molar parts) of a PO 2 mol adduct of bisphenol A, 392 parts by weight (66.5 molar parts) of terephthalic acid, 61 parts by weight (11.7 molar parts) of adipic acid, 76 parts by weight (17.5 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 29 parts by weight (4.3 molar parts) of trimellitic anhydride was added and then allowed to react under normal pressure for one hour, affording a polyester resin (A-1). The recovered propylene glycol weighed 259 parts by weight.

Example 2

Synthesis of Polyester Resin (A-2)

A reaction vessel equipped with a stirrer, a heating and cooling apparatus, a thermometer, a cooling tube, and a nitrogen introduction tube was charged with 432 parts by weight (66.0 molar parts with the exception of 264 parts of the recovery described below) of propylene glycol, 396 parts by weight (34.0 molar parts) of a PO 2 mol adduct of bisphenol A, 434 parts by weight (74.8 molar parts) of terephthalic acid, 33 parts by weight (6.5 molar parts) of adipic acid, 78 parts by weight (18.2 molar parts) of benzoic acid, and 2.5 parts by weight of titanium diisopropoxybis-triethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 3 parts by weight (0.5 molar parts) of trimellitic anhydride was added and then allowed to react under normal pressure for one hour, affording a polyester resin (A-2). The recovered propylene glycol weighed 265 parts by weight.

Example 3

Synthesis of Polyester Resin (A-3)

A reaction vessel equipped with a stirrer, a heating and cooling apparatus, a thermometer, a cooling tube, and a nitrogen introduction tube was charged with 432 parts by weight (66.0 molar parts with the exception of 265 parts by weight of the recovery described below) of propylene glycol, 396 parts by weight (34.0 molar parts) of a PO 2 mol adduct of bisphenol A, 401 parts by weight (70.8 molar parts) of terephthalic acid, 62 parts by weight (12.5 molar parts) of adipic acid, 51 parts by weight (12.3 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 29 parts by weight (4.4 molar parts) of trimellitic anhydride was added and then allowed to react under normal pressure for one hour, affording a polyester resin (A-3). The recovered propylene glycol weighed 265 parts by weight.

Example 4

Synthesis of Polyester Resin (A-4)

A reaction vessel equipped with a stirrer, a heating and cooling apparatus, a thermometer, a cooling tube, and a nitrogen introduction tube was charged with 394 parts by weight (66.4 molar parts with the exception of 239 parts by weight of the recovery described below) of propylene glycol, 417 parts by weight (33.6 molar parts) of a PO 3 mol adduct of bisphenol A, 430 parts by weight (77.0 molar parts) of terephthalic acid, 20 parts by weight (51.2 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 17 parts by weight (2.6 molar parts) of trimellitic anhydride was added and then allowed to react under normal pressure for one hour, affording a polyester resin (A-4). The recovered propylene glycol weighed 239 parts by weight.

Example 5

Synthesis of Polyester Resin (A-5)

A reaction vessel equipped with a stirrer, a heating and cooling apparatus, a thermometer, a cooling tube, and a nitrogen introduction tube was charged with 435 parts by weight (62.3 molar parts with the exception of 291 parts of the recovery described below) of propylene glycol, 460 parts by weight (37.7 molar parts) of a PO 3 mol adduct of bisphenol A, 392 parts by weight (77.3 molar parts) of terephthalic acid, 73 parts by weight (16.4 molar parts) of adipic acid, 6.1 parts by weight (1.6 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 27.3 parts by weight (4.7 molar parts) of trimellitic anhydride was added and then allowed to react under normal pressure for one hour, affording a polyester resin (A-5). The recovered propylene glycol weighed 291 parts by weight.

Example 6

Synthesis of Polyester Resin (A-6)

A reaction vessel equipped with a stirrer, a heating and cooling apparatus, a thermometer, a cooling tube, and a nitrogen introduction tube was charged with 419 parts by weight (66.0 molar parts with the exception of 256 parts by weight of the recovery described below) of propylene glycol, 384 parts by weight (34.0 molar parts) of a PO 2 mol adduct of bisphenol A, 458 parts by weight (78.3 molar parts) of terephthalic acid, 76 parts by weight (17.7 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 27.3 parts by weight (4.0 molar parts) of trimellitic anhydride was added and then allowed to react under normal pressure for one hour, affording a polyester resin (A-6). The recovered propylene glycol weighed 256 parts by weight.

Example 7

Synthesis of Polyester Resin (A-7)

A reaction vessel equipped with a stirrer, a heating and cooling apparatus, a thermometer, a cooling tube, and a nitrogen introduction tube was charged with 391 parts by weight (66.4 molar parts with the exception of 237 parts by weight of the recovery described below) of propylene glycol, 414 parts by weight (33.6 molar parts) of a PO 3 mol adduct of bisphenol A, 427 parts by weight (76.0 molar parts) of terephthalic acid, 76 parts by weight (18.6 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 16.8 parts by weight (2.6 molar parts) of trimellitic anhydride and 14.2 parts by weight (2.8 molar parts) of phthalic anhydride were added and then allowed to react under normal pressure for one hour, affording a polyester resin (A-7). The recovered propylene glycol weighed 237 parts by weight.

Example 8

Synthesis of Polyester Resin (A-8)

A reaction vessel equipped with a stirrer, a heating and cooling apparatus, a thermometer, a cooling tube, and a nitrogen introduction tube was charged with 410 parts by weight (66.2 molar parts with the exception of 250 parts by weight of the recovery described below) of propylene glycol, 211 parts by weight (19.0 molar parts) of a PO 2 mol adduct of bisphenol A, 190 parts by weight (14.8 molar parts) of a PO 3 mol adduct of bisphenol A, 448 parts by weight (79.5 molar parts) of terephthalic acid, 67 parts by weight (16.3 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 27.3 parts by weight (4.2 molar parts) of trimellitic anhydride was added and then allowed to react under normal pressure for one hour, affording a polyester resin (A-8). The recovered propylene glycol weighed 250 parts by weight.

Example 9

Synthesis of Polyester Resin (A-9)

A reaction vessel equipped with a stirrer, a heating and cooling apparatus, a thermometer, a cooling tube, and a nitrogen introduction tube was charged with 234 parts by weight (35.4 molar parts with the exception of 165 parts by weight of the recovery described below) of propylene glycol, 571 parts by weight (64.6 molar parts) of a PO 2 mol adduct of bisphenol A, 340 parts by weight (72.9 molar parts) of terephthalic acid, 76 parts (22.1 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 27.3 parts by weight (5.1 molar parts) of trimellitic anhydride was added and then allowed to react under normal pressure for one hour, affording a polyester resin (A-9). The recovered propylene glycol weighed 165 parts by weight.

Example 10

Synthesis of Polyester Resin (A-10)

A reaction vessel equipped with a stirrer, a heating and cooling apparatus, a thermometer, a cooling tube, and a nitrogen introduction tube was charged with 405 parts by weight (66.0 molar parts with the exception of 248 parts by weight of the recovery described below) of propylene glycol, 371 parts by weight (34.0 molar parts) of a PO 2 mol adduct of bisphenol A, 442 parts by weight (78.2 molar parts) of terephthalic acid, 107 parts by weight (17.6 molar parts) of t-butylbenzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 27.3 parts by weight (4.0 molar parts) of trimellitic anhydride was added and then allowed to react under normal pressure for one hour, affording a polyester resin (A-10). The recovered propylene glycol weighed 256 parts by weight.

Example 11

Synthesis of Polyester Resin (A-11)

A reaction vessel equipped with a stirrer, a heating and cooling apparatus, a thermometer, a cooling tube, and a nitrogen introduction tube was charged with 433 parts by weight (65.4 molar parts with the exception of 270 parts of the recovery described below) of 1,3-propanediol, 396 parts by weight (34.6 molar parts) of a PO 2 mol adduct of bisphenol A, 435 parts by weight (76.4 molar parts) of terephthalic acid, 33 parts by weight (6.6 molar parts) of adipic acid, 54.7 parts by weight (13.1 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 25.6 parts by weight (3.9 molar parts) of trimellitic anhydride was added and then allowed to react under normal pressure for one hour, affording a polyester resin (A-11). The recovered 1,3-propanediol weighed 270 parts by weight.

Example 12

Synthesis of Polyester Resin (A-12)

A reaction vessel equipped with a stirrer, a heating and cooling apparatus, a thermometer, a cooling tube, and a nitrogen introduction tube was charged with 427 parts by weight (47.8 molar parts with the exception of 301 parts by weight of the recovery described below) of propylene glycol, 452 parts by weight (32.8 molar parts) of a PO 3 mol adduct of bisphenol A, 467 parts by weight (94.3 molar parts) of terephthalic acid, 300 parts by weight (18.5 molar parts with the exception of 280 parts by weight of the recovery described below) of methanol, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 32.4 parts by weight (5.7 molar parts) of trimellitic anhydride was added and then allowed to react under normal pressure for one hour, affording a polyester resin (A-12). The recovered propylene glycol weighed 239 parts by weight and methanol weighed 280 parts by weight.

Example 13

Synthesis of Polyester Resin (A-13)

A reaction vessel equipped with a stirrer, a heating and cooling apparatus, a thermometer, a cooling tube, and a nitrogen introduction tube was charged with 127 parts by weight (7.8 molar parts with the exception of 114 parts by weight of the recovery described below) of propylene glycol, 688 parts by weight (92.2 molar parts) of a PO 2 mol adduct of bisphenol A, 278 parts by weight (72.5 molar parts) of terephthalic acid, 52 parts (18.4 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 20.2 parts by weight (4.6 molar parts) of trimellitic anhydride and 15.5 parts by weight (4.5 molar parts) of phthalic anhydride were added and then allowed to react under normal pressure for one hour, affording a polyester resin (A-13). The recovered propylene glycol weighed 114 parts by weight.

Example 14

Synthesis of Polyester Resin (A-14)

A reaction vessel equipped with a stirrer, a heating and cooling apparatus, a thermometer, a cooling tube, and a nitrogen introduction tube was charged with 449 parts by weight (61.4 molar parts with the exception of 299 parts by weight of the recovery described below) of propylene glycol, 432 parts by weight (38.6 molar parts) of a PO 2 mol adduct of bisphenol A, 490 parts by weight (92.6 molar parts) of terephthalic acid, 19 parts (4.9 molar parts) of benzoic acid, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 15.4 parts by weight (2.5 molar parts) of trimellitic anhydride was added and then allowed to react under normal pressure for one hour, affording a polyester resin (A-14). The recovered propylene glycol weighed 299 parts by weight.

Example 15

Synthesis of Polyester Resin (A-15)

A reaction vessel equipped with a stirrer, a heating and cooling apparatus, a thermometer, a cooling tube, and a nitrogen introduction tube was charged with 453 parts by weight (61.0 molar parts with the exception of 304 parts by weight of the recovery described below) of propylene glycol, 436 parts by weight (39.0 molar parts) of a PO 2 mol adduct of bisphenol A, 495 parts by weight (93.7 molar parts) of terephthalic acid, 19 parts (4.9 molar parts) of benzoic acid, and 2.5 parts of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 8.5 parts by weight (1.4 molar parts) of trimellitic anhydride was added and then allowed to react under normal pressure for one hour, affording a polyester resin (A-15). The recovered propylene glycol weighed 304 parts by weight.

Comparative Example 1

Synthesis of Comparative Polyester Resin (RA-1)

A reaction vessel equipped with a stirrer, a heating and cooling apparatus, a thermometer, a cooling tube, and a nitrogen introduction tube was charged with 503 parts by weight (100.0 molar parts) of propylene glycol, 732 parts by weight (96.9 molar parts) of terephthalic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 27.3 parts by weight (3.1 molar parts) of trimellitic anhydride was added and then allowed to react under normal pressure for one hour, affording a polyester resin (RA-1). The recovered propylene glycol weighed 106 parts by weight.

Comparative Example 2

Synthesis of Comparative Polyester Resin (RA-2)

A reaction vessel equipped with a stirrer, a heating and cooling apparatus, a thermometer, a cooling tube, and a nitrogen introduction tube was charged with 642 parts by weight (100.0 molar parts) of propylene glycol, 701 parts by weight (90.1 molar parts) of terephthalic acid, 47 parts by weight (6.9 molar parts) of adipic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 27.3 parts by weight (3.0 molar parts) of trimellitic anhydride was added and then allowed to react under normal pressure for one hour, affording a polyester resin (RA-2). The recovered propylene glycol weighed 257 parts by weight.

Comparative Example 3

Synthesis of Comparative Polyester Resin (RA-3)

A reaction vessel equipped with a stirrer, a heating and cooling apparatus, a thermometer, a cooling tube, and a nitrogen introduction tube was charged with 399 parts by weight (100.0 molar parts) of ethylene glycol, 405 parts by weight (48.6 molar parts) of terephthalic acid, 405 parts by weight (48.6 molar parts) of isophthalic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 27.3 parts by weight (2.8 molar parts) of trimellitic anhydride was added and then allowed to react under normal pressure for one hour, affording a polyester resin (RA-3). The recovered ethylene glycol weighed 64 parts by weight.

Comparative Example 4

Synthesis of Comparative Polyester Resin (RA-4)

A reaction vessel equipped with a stirrer, a heating and cooling apparatus, a thermometer, a cooling tube, and a nitrogen introduction tube was charged with 453 parts by weight (65.8 molar parts with the exception of 279 parts by weight of the recovery described below) of propylene glycol, 415 parts by weight (34.2 molar parts) of a PO 2 mol adduct of bisphenol A, 421 parts by weight (80.9 molar parts) of terephthalic acid, 65 parts by weight (14.3 molar parts) of adipic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 29.0 parts by weight (4.8 molar parts) of trimellitic anhydride was added and then allowed to react under normal pressure for one hour, affording a polyester resin (RA-4). The recovered propylene glycol weighed 279 parts by weight.

Comparative Example 5

Synthesis of Comparative Polyester Resin (RA-5)

A reaction vessel equipped with a stirrer, a heating and cooling apparatus, a thermometer, a cooling tube, and a nitrogen introduction tube was charged with 354 parts by weight (65.8 molar parts with the exception of 218 parts by weight of the recovery described below) of ethylene glycol, 398 parts by weight (34.0 molar parts) of a PO 2 mol adduct of bisphenol A, 237 parts by weight (39.4 molar parts) of terephthalic acid, 237 parts by weight (39.4 molar parts) of isophthalic acid, 76 parts by weight (17.2 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 27.3 parts by weight (3.9 molar parts) of trimellitic anhydride was added and then allowed to react under normal pressure for one hour, affording a polyester resin (RA-5). The recovered ethylene glycol weighed 218 parts by weight.

Comparative Example 6

Synthesis of Comparative Polyester Resin (RA-6)

A reaction vessel equipped with a stirrer, a heating and cooling apparatus, a thermometer, a cooling tube, and a nitrogen introduction tube was charged with 195 parts by weight (66.3 molar parts with the exception of 3 parts of the recovery described below) of 1.4-butanediol, 376 parts by weight (33.7 molar parts) of a PO 2 mol adduct of bisphenol A, 381 parts by weight (69.9 molar parts) of terephthalic acid, 59 parts by weight (12.3 molar parts) of adipic acid, 61 parts by weight (15.1 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 16.8 parts by weight (2.6 molar parts) of trimellitic anhydride and 18.1 parts by weight (3.6 molar parts) of phthalic anhydride were added and then allowed to react under normal pressure for one hour, affording a polyester resin (RA-6). The recovered 1,4-butanediol weighed 3 parts by weight.

Comparative Example 7

Synthesis of Comparative Polyester Resin (RA-7)

A reaction vessel equipped with a stirrer, a heating and cooling apparatus, a thermometer, a cooling tube, and a nitrogen introduction tube was charged with 713 parts by weight (100.0 molar parts) of a PO 2 mol adduct of bisphenol A, 214 parts by weight (59.8 molar parts) of terephthalic acid, 33 parts by weight (10.6 molar parts) of adipic acid, 67 parts by weight (25.6 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 16.8 parts by weight (3.8 molar parts) of trimellitic anhydride and 18.1 parts (5.4 molar parts) of phthalic anhydride were added and then allowed to react under normal pressure for one hour, affording a polyester resin (RA-7).

Comparative Example 8

Synthesis of Comparative Polyester Resin (RA-8)

A reaction vessel equipped with a stirrer, a heating and cooling apparatus, a thermometer, a cooling tube, and a nitrogen introduction tube was charged with 498 parts by weight (79.5 molar parts with the exception of 270 parts by weight of the recovery described below) of propylene glycol, 268 parts (20.5 molar parts) of a PO 2 mol adduct of bisphenol A, 462 parts by weight (72.3 molar parts) of terephthalic acid, 72 parts by weight (12.8 molar parts) of adipic acid, 59 parts by weight (12.6 molar parts) of benzoic acid, and 2.5 parts by weight of titanium diisopropoxybistriethanolaminate as a polymerization catalyst, and these were allowed to react with one another at 210° C. under a nitrogen gas flow for 5 hours while generated water being distilled off, and then further allowed to react under a reduced pressure of 0.007 to 0.026 MPa for one hour. After subsequent cooling to 180° C., 16.8 parts by weight (2.2 molar parts) of trimellitic anhydride and 18.1 parts by weight (3.1 molar parts) of phthalic anhydride were added and then allowed to react under normal pressure for one hour, affording a polyester resin (RA-8). The recovered propylene glycol weighed 270 parts by weight.

Physical property values of the polyester resins (A-1) to (A-15) obtained in Examples 1 to 15 and the polyester resins (RA-1) to (RA-8) obtained in Comparative Examples 1 to 8 are shown in Tables 1 and 2. In Tables 1 and 2, (a1) denotes a polycarboxylic acid, (a21) denotes an alkylene glycol having 3 carbon atoms, (a22) denotes a diol having an aromatic ring, (a3) denotes a monocarboxylic acid, and (a4) denotes a monohydric alcohol.

TABLE 1

| | | Example 1 | Example 2 | Example 3 | Example 4 | Example 5 | Example 6 |
|---|---|---|---|---|---|---|---|
| | Polyester resin (A), (RA) | (A-1) | (A-2) | (A-3) | (A-4) | (A-5) | (A-6) |
| (a1) | Terephthalic acid | 392 | 434 | 401 | 430 | 392 | 458 |
| | Adipic acid | 61 | 33 | 62 | — | 73 | — |
| | Isophthalic acid | — | — | — | — | — | — |
| | Trimellitic anhydride | 29 | 3 | 29 | 17 | 27.3 | 27.3 |
| | Phthalic anhydride | — | — | — | — | — | — |
| (a21) | Propylene glycol | 164 | 168 | 167 | 155 | 144 | 163 |
| | 1,3-Propanediol | — | — | — | — | — | — |
| — | Ethylene glycol | — | — | — | — | — | — |
| | 1,4-Butanediol | — | — | — | — | — | — |
| (a22) | PO 2 mol adduct of bisphenol A | 387 | 396 | 396 | — | — | 384 |
| | PO 3 mol adduct of bisphenol A | — | — | — | 417 | 460 | — |
| | (a21)/(a22) (molar ratio) | 66/34 | 66/34 | 66/34 | 66/34 | 62/38 | 66/34 |
| (a3) | Benzoic acid | 76 | 78 | 51 | 20 | 6 | 76 |
| | t-Butylbenzoic acid | — | — | — | — | — | — |
| (a4) | Methanol | — | — | — | — | — | — |
| | Ester group concentration (% by weight) | 27.1 | 26.9 | 27.1 | 25.1 | 26.1 | 26.8 |
| | Value of the left side of condition 1 | 7,826 | 8,860 | 9,176 | 7,728 | 8,947 | 8,387 |
| | Mn | 1,850 | 1,830 | 1,940 | 1,850 | 2,830 | 1,890 |
| | Mw | 4,030 | 3,980 | 4,140 | 4,220 | 6,360 | 4,240 |
| | Tg (° C.) | 41 | 42 | 43 | 43 | 42 | 56 |
| | Acid value (mgKOH/g) | 16 | 2 | 17 | 11 | 16 | 17 |
| | Hydroxy value (mgKOH/g) | 18 | 30 | 33 | 22 | 33 | 25 |
| | Falling temperature before moisture heat resistance test T0 (° C.) | 104 | 105 | 108 | 108 | 112 | 120 |
| | Falling temperature after moisture heat resistance test T1 (° C.) | 99 | 104 | 103 | 104 | 106 | 115 |
| | |T0 − T1| | 5 | 1 | 5 | 4 | 6 | 5 |
| | Water content after moisture heat resistance test (ppm) | 8,800 | 9,000 | 8,500 | 7,800 | 8,200 | 9,400 |

TABLE 1-continued

|  |  | Example 7 | Example 8 | Example 9 | Example 10 | Example 11 | Example 12 |
|---|---|---|---|---|---|---|---|
|  | Polyester resin (A), (RA) | (A-7) | (A-8) | (A-9) | (A-10) | (A-11) | (A-12) |
| (a1) | Terephthalic acid | 427 | 448 | 340 | 442 | 435 | 467 |
|  | Adipic acid | — | — | — | — | 33 | — |
|  | Isophthalic acid | — | — | — | — | — | — |
|  | Trimellitic anhydride | 16.8 | 27.3 | 27.3 | 27.3 | 25.6 | 32.4 |
|  | Phthalic anhydride | 14.2 | — | — | — | — | — |
| (a21) | Propylene glycol | 154 | 160 | 69 | 157 | — | 126 |
|  | 1,3-Propanediol | — | — | — | — | 163 | — |
| — | Ethylene glycol | — | — | — | — | — | — |
|  | 1,4-Butanediol | — | — | — | — | — | — |
| (a22) | PO 2 mol adduct of bisphenol A | — | 211 | 571 | 371 | 396 | — |
|  | PO 3 mol adduct of bisphenol A | 414 | 190 | — | — | — | 452 |
|  | (a21)/(a22) (molar ratio) | 66/34 | 66/34 | 35/65 | 66/34 | 65/35 | 60/40 |
| (a3) | Benzoic acid | 76 | 67 | 76 | — | 55 | — |
|  | t-Butylbenzoic acid | — | — | — | 107 | — | — |
| (a4) | Methanol | — | — | — | — | — | 20 |
|  | Ester group concentration (% by weight) | 25.1 | 26.0 | 19.9 | 26.8 | 27.1 | 25.7 |
|  | Value of the left side of condition 1 | 7,548 | 7,844 | 6,447 | 8,387 | 7,826 | 8,221 |
|  | Mn | 1,790 | 1,840 | 1,800 | 1,900 | 2,100 | 3,200 |
|  | Mw | 3,900 | 4,200 | 4,500 | 4,350 | 4,600 | 6,850 |
|  | Tg (° C.) | 42 | 51 | 51 | 57 | 53 | 70 |
|  | Acid value (mgKOH/g) | 16 | 16 | 16 | 17 | 15 | 19 |
|  | Hydroxy value (mgKOH/g) | 20 | 21 | 21 | 25 | 18 | 26 |
|  | Falling temperature before moisture heat resistance test T0 (° C.) | 107 | 115 | 116 | 122 | 118 | 125 |
|  | Falling temperature after moisture heat resistance test T1 (° C.) | 100 | 109 | 110 | 118 | 112 | 119 |
|  | \|T0 − T1\| | 7 | 6 | 6 | 4 | 6 | 6 |
|  | Water content after moisture heat resistance test (ppm) | 8,800 | 7,900 | 8,000 | 8,500 | 9,500 | 8,500 |

TABLE 2

|  |  | Example 13 | Example 14 | Example 15 | Comparative Example 1 | Comparative Example 2 | Comparative Example 3 |
|---|---|---|---|---|---|---|---|
|  | Polyester resin (A), (RA) | (A-13) | (A-14) | (A-15) | (RA-1) | (RA-2) | (RA-3) |
| (a1) | Terephthalic acid | 278 | 490 | 495 | 732 | 701 | 405 |
|  | Adipic acid | — | — | — | — | 47 | — |
|  | Isophthalic acid | — | — | — | — | — | 405 |
|  | Trimellitic anhydride | 20.2 | 15.4 | 8.5 | 27.3 | 27.3 | 27.3 |
|  | Phthalic anhydride | 15.5 | — | — | — | — | — |
| (a21) | Propylene glycol | 13 | 150 | 149 | 397 | 385 | — |
|  | 1,3-Propanediol | — | — | — | — | — | — |
| — | Ethylene glycol | — | — | — | — | — | 335 |
|  | 1,4-Butanediol | — | — | — | — | — | — |
| (a22) | PO 2 mol adduct of bisphenol A | 688 | 432 | 436 | — | — | — |
|  | PO 3 mol adduct of bisphenol A | — | — | — | — | — | — |
|  | (a21)/(a22) (molar ratio) | 8/92 | 61/39 | 61/39 | 100/0 | 100/0 | 100/0 |
| (a3) | Benzoic acid | 52 | 19 | 19 | — | — | — |
|  | t-Butylbenzoic acid | — | — | — | — | — | — |
| (a4) | Methanol | — | — | — | — | — | — |
|  | Ester group concentration (% by weight) | 16.0 | 26.9 | 27.0 | 41.1 | 44.2 | 41.0 |
|  | Value of the left side of condition 1 | 5,284 | 7,636 | 7,515 | 14,632 | 15,612 | 13,169 |
|  | Mn | 1,950 | 3,700 | 4,200 | 1,900 | 1,850 | 1,800 |
|  | Mw | 4,500 | 7,850 | 9,300 | 4,450 | 4,300 | 4,400 |
|  | Tg (° C.) | 52 | 79 | 79 | 60 | 58 | 58 |
|  | Acid value (mgKOH/g) | 18 | 9 | 5 | 17 | 17 | 16 |
|  | Hydroxy value (mgKOH/g) | 18 | 16 | 15 | 58 | 61 | 42 |
|  | Falling temperature before moisture heat resistance test T0 (° C.) | 116 | 140 | 141 | 121 | 118 | 120 |
|  | Falling temperature after moisture heat resistance test T1 (° C.) | 110 | 138 | 138 | 96 | 102 | 97 |
|  | \|T0 − T1\| | 6 | 2 | 3 | 25 | 16 | 23 |
|  | Water content after moisture heat resistance test (ppm) | 7,100 | 7,600 | 7,400 | 17,000 | 15,000 | 14,000 |

TABLE 2-continued

| | | Comparative Example 4 | Comparative Example 5 | Comparative Example 6 | Comparative Example 7 | Comparative Example 8 |
|---|---|---|---|---|---|---|
| | Polyester resin (A), (RA) | (RA-4) | (RA-5) | (RA-6) | (RA-7) | (RA-8) |
| (a1) | Terephthalic acid | 421 | 237 | 381 | 214 | 462 |
| | Adipic acid | 65 | — | 59 | 33 | 72 |
| | Isophthalic acid | — | 237 | — | — | — |
| | Trimellitic anhydride | 29 | 27.3 | 16.8 | 16.8 | 16.8 |
| | Phthalic anhydride | — | — | 18.1 | 18.1 | 18.1 |
| (a21) | Propylene glycol | 174 | — | — | — | 228 |
| | 1,3-Propanediol | — | — | — | — | — |
| — | Ethylene glycol | — | 136 | — | — | — |
| | 1,4-Butanediol | — | — | 192 | — | — |
| (a22) | PO 2 mol adduct of bisphenol A | 415 | 398 | 376 | 713 | — |
| | PO 3 mol adduct of bisphenol A | — | — | — | — | — |
| | (a21)/(a22) (molar ratio) | 66/34 | 0/100 | 0/100 | 0/100 | 80/20 |
| (a3) | Benzoic acid | — | 76 | 61 | 67 | 59 |
| | t-Butylbenzoic acid | — | — | — | — | — |
| (a4) | Methanol | — | — | — | — | — |
| | Ester group concentration (% by weight) | 27.1 | 27.8 | 26.1 | 14.7 | 31.6 |
| | Value of the left side of condition 1 | 10,760 | 8,436 | 7,597 | 5,013 | 8,787 |
| | Mn | 1,900 | 1,850 | 1,800 | 1,700 | 1,860 |
| | Mw | 4,000 | 4,400 | 4,000 | 4,000 | 4,100 |
| | Tg (° C.) | 43 | 60 | 39 | 42 | 41 |
| | Acid value (mgKOH/g) | 17 | 17 | 17 | 17 | 17 |
| | Hydroxy value (mgKOH/g) | 51 | 23 | 18 | 18 | 17 |
| | Falling temperature before moisture heat resistance test T0 (° C.) | 105 | 123 | 101 | 107 | 107 |
| | Falling temperature after moisture heat resistance test T1 (° C.) | 90 | 119 | 92 | 88 | 94 |
| | \|T0 − T1\| | 15 | 4 | 9 | 19 | 13 |
| | Water content after moisture heat resistance test (ppm) | 13,200 | 8,800 | 8,100 | 7,000 | 9,500 |

Production Example 1

Synthesis of Nonlinear Polyester Resin (B1-1)

A reaction vessel equipped with a stirrer, a heating and cooling apparatus, a thermometer, a cooling tube, and a nitrogen introduction tube was charged with 785 parts by weight (22.0 molar parts with the exception of 391 parts by weight of the recovery described below) of propylene glycol, 529 parts by weight (5.8 molar parts) of dimethyl terephthalate, 288 parts by weight (4.2 molar parts) of adipic acid, 39 parts by weight (0.4 molar parts) of trimellitic anhydride, and 3 parts by weight of tetrabutoxy titanate as a polycondensation catalyst, and these were caused to react with one another at 180° C. under a nitrogen gas flow for 8 hours while generated methanol being distilled off. Then, a reaction was allowed to proceed for 4 hours under a nitrogen gas flow while the temperature was gradually elevated to 230° C. and generated propylene glycol and water were distilled off, and further a reaction was allowed to proceed under a reduced pressure of 0.007 to 0.026 MPa, and the product was taken out when the softening point reached 105° C. Thus, a nonlinear polyester resin (B1-1) was obtained. The (B1-1) had a Tg of 50° C., an Mw of 120,000, an acid value of 1, and a hydroxy value of 20. The recovered propylene glycol weighed 391 parts by weight.

Production Example 2

Synthesis of Nonlinear Polyester Resin (B1-2)

A reaction vessel equipped with a stirrer, a heating and cooling apparatus, a thermometer, a cooling tube, and a nitrogen introduction tube was charged with 592 parts by weight (8.0 molar parts) of PO 2 mol adduct of bisphenol A, 139 parts by weight (2.0 molar parts) of EO 2 mol adduct of bisphenol A, 283 parts by weight (8.0 molar parts) of terephthalic acid, 54 parts by weight (1.3 molar parts) of trimellitic anhydride, and 3 parts by weight of tetrabutoxy titanate as a polycondensation catalyst, and these were caused to react with one another at 230° C. under a nitrogen gas flow for 5 hours while generated water being distilled off. Subsequently, a reaction was allowed to proceed under a reduced pressure of 0.007 to 0.026 MPa, and the product was taken out when the softening point reached 159° C. Thus, a nonlinear polyester resin (B1-2) was obtained. The (B1-2) had a Tg of 65° C., an Mw of 90,000, an acid value of 10, and a hydroxy value of 10.

Examples 16 to 32, Comparative Examples 9 to 16

Toner binders of the present invention and comparative toner binders were obtained using the polyester resins (A-1) to (A-15) obtained in Examples 1 to 15 and the polyester resins (RA-1) to (RA-8) obtained in Comparative Examples 1 to 8 and blending the nonlinear polyester resins (B1-1) and (B1-2) obtained in Production Examples 1 to 2 in the blending ratios (parts by weight) given in Tables 3 and 4, and then toners were prepared by the following method.

First, 8 parts by weight of carbon black MA-100 [produced by Mitsubishi Chemical Corporation], 5 parts by weight of carnauba wax, and 1 part by weight of a charge control agent T-77 [produced by Hodogaya Chemical Co., Ltd.] were added, then these were preliminarily mixed with a Henschel mixer [FM1OB manufactured by Nippon Coke & Engineering Co., Ltd.], and then kneaded with a twin screw kneader [PCM-30 manufactured by Ikegai Corp.]. Next, after being finely pulverized with a supersonic jet pulverizer Labo Jet [manufactured by Nippon Pneumatic Mfg. Co., Ltd.], the resulting particles were classified with an airflow classifier [MDS-I, manufactured by Nippon Pneumatic Mfg. Co., Ltd.], so that toner particles having a particle diameter D50 of 8 μm were obtained. Next, 0.5 parts by weight of colloidal silica (Aerosil R972; produced by Nippon Aerosil Co., Ltd.) was added to 100 parts by weight of the toner particles and mixed in a sample mill, so that toners of the present invention (D-1) to (D-17) and comparative toner compositions (RD-1) to (RD-8) were obtained.

The compositions and the results evaluated by the methods described below of Examples 16 to 32 and Comparative Examples 9 to 16 are shown in Tables 3 and 4.

TABLE 3

|  |  | Example 16 D-1 | Example 17 D-2 | Example 18 D-3 | Example 19 D-4 | Example 20 D-5 | Example 21 D-6 | Example 22 D-7 |
|---|---|---|---|---|---|---|---|---|
| Toner binder | (A-1) | 70 | — | — | — | — | — | — |
|  | (A-2) | — | 70 | — | — | — | — | — |
|  | (A-3) | — | — | 70 | — | — | — | — |
|  | (A-4) | — | — | — | 70 | — | — | — |
|  | (A-5) | — | — | — | — | 70 | — | — |
|  | (A-6) | — | — | — | — | — | 70 | — |
|  | (A-7) | — | — | — | — | — | — | 70 |
|  | (A-8) | — | — | — | — | — | — | — |
|  | (A-9) | — | — | — | — | — | — | — |
|  | (A-10) | — | — | — | — | — | — | — |
|  | (A-11) | — | — | — | — | — | — | — |
|  | (A-12) | — | — | — | — | — | — | — |
|  | (A-13) | — | — | — | — | — | — | — |
|  | (B-1) | 30 | 30 | 30 | 30 | 30 | 30 | 30 |
| Carbon black MA-100 |  | 8 | 8 | 8 | 8 | 8 | 8 | 8 |
| Carnauba wax |  | 5 | 5 | 5 | 5 | 5 | 5 | 5 |
| Charge control agent T-77 |  | 1 | 1 | 1 | 1 | 1 | 1 | 1 |
| Volume average particle diameter (μm) |  | 8.0 | 8.0 | 8.1 | 8.0 | 7.9 | 8.0 | 8.0 |
| Particle size distribution |  | 1.21 | 1.22 | 1.21 | 1.26 | 1.25 | 1.21 | 1.22 |
| Minimum fixing temperature [° C.] |  | 130 | 130 | 130 | 135 | 135 | 145 | 135 |
| Heat-resistant storage stability |  | ○ | ○ | ○ | ○ | ○ | ○ | ○ |
| Moisture heat-resistant storage stability |  | ⊙ | ○ | ⊙ | ⊙ | ⊙ | ⊙ | ⊙ |
| Member staining property |  | ⊙ | ○ | ○ | ⊙ | ○ | ⊙ | ⊙ |

|  |  | Example 23 D-8 | Example 24 D-9 | Example 25 D-10 | Example 26 D-11 | Example 27 D-12 | Example 28 D-13 |
|---|---|---|---|---|---|---|---|
| Toner binder | (A-1) | — | — | — | — | — | — |
|  | (A-2) | — | — | — | — | — | — |
|  | (A-3) | — | — | — | — | — | — |
|  | (A-4) | — | — | — | — | — | — |
|  | (A-5) | — | — | — | — | — | — |
|  | (A-6) | — | — | — | — | — | — |
|  | (A-7) | — | — | — | — | — | — |
|  | (A-8) | 70 | — | — | — | — | — |
|  | (A-9) | — | 70 | — | — | — | — |
|  | (A-10) | — | — | 70 | — | — | — |
|  | (A-11) | — | — | — | 70 | — | — |
|  | (A-12) | — | — | — | — | 70 | — |
|  | (A-13) | — | — | — | — | — | 70 |
|  | (B-1) | 30 | 30 | 30 | 30 | 30 | 30 |
| Carbon black MA-100 |  | 8 | 8 | 8 | 8 | 8 | 8 |
| Carnauba wax |  | 5 | 5 | 5 | 5 | 5 | 5 |
| Charge control agent T-77 |  | 1 | 1 | 1 | 1 | 1 | 1 |
| Volume average particle diameter (μm) |  | 7.9 | 8.1 | 8.0 | 7.9 | 8.0 | 8.0 |
| Particle size distribution |  | 1.23 | 1.26 | 1.24 | 1.25 | 1.23 | 1.26 |
| Minimum fixing temperature [° C.] |  | 135 | 140 | 135 | 140 | 145 | 140 |
| Heat-resistant storage stability |  | ○ | ○ | ○ | ○ | ○ | ○ |
| Moisture heat-resistant storage stability |  | ⊙ | ⊙ | ○ | ○ | ⊙ | ⊙ |
| Member staining property |  | ⊙ | Δ | Δ | ○ | ⊙ | ○ |

TABLE 4

|  |  | Example 29 D-14 | Example 30 D-15 | Example 31 D-16 | Example 32 D-17 | Comparative Example 9 RD-1 | Comparative Example 10 RD-2 |
|---|---|---|---|---|---|---|---|
| Toner binder | (A-7) | — | — | 70 | — | — | — |
|  | (A-9) | — | — | — | 70 | — | — |
|  | (A-14) | 70 | — | — | — | — | — |
|  | (A-15) | — | 70 | — | — | — | — |
|  | (B-1) | 30 | 30 | — | — | 30 | 30 |

TABLE 4-continued

|  |  |  |  |  |  |  |  |
|---|---|---|---|---|---|---|---|
|  | (B-2) | — | — | 30 | 30 | — | — |
|  | (RA-1) | — | — | — | — | 70 | — |
|  | (RA-2) | — | — | — | — | — | 70 |
|  | (RA-3) | — | — | — | — | — | — |
|  | (RA-4) | — | — | — | — | — | — |
|  | (RA-5) | — | — | — | — | — | — |
|  | (RA-6) | — | — | — | — | — | — |
|  | (RA-7) | — | — | — | — | — | — |
|  | (RA-8) | — | — | — | — | — | — |
| Carbon black MA-100 |  | 8 | 8 | 8 | 8 | 8 | 8 |
| Carnauba wax |  | 5 | 5 | 5 | 5 | 5 | 5 |
| Charge control agent T-77 |  | 1 | 1 | 1 | 1 | 1 | 1 |
| Volume average particle diameter (μm) |  | 8.0 | 7.9 | 8.1 | 8.0 | 8.0 | 8.0 |
| Particle size distribution |  | 1.25 | 1.24 | 1.22 | 1.25 | 1.22 | 1.23 |
| Minimum fixing temperature [° C.] |  | 155 | 160 | 135 | 140 | 145 | 135 |
| Heat-resistant storage stability |  | ○ | ○ | ○ | ○ | X | X |
| Moisture heat-resistant storage stability |  | ⊙ | ⊙ | ⊙ | ⊙ | X | X |
| Member staining property |  | ⊙ | ⊙ | ⊙ | Δ | X | X |

|  |  | Comparative Example 11 RD-3 | Comparative Example 12 RD-4 | Comparative Example 13 RD-5 | Comparative Example 14 RD-6 | Comparative Example 15 RD-7 | Comparative Example 16 RD-8 |
|---|---|---|---|---|---|---|---|
| Toner binder | (A-7) | — | — | — | — | — | — |
|  | (A-9) | — | — | — | — | — | — |
|  | (A-14) | — | — | — | — | — | — |
|  | (A-15) | — | — | — | — | — | — |
|  | (B-1) | 30 | 30 | 30 | 30 | 30 | 30 |
|  | (B-2) | — | — | — | — | — | — |
|  | (RA-1) | — | — | — | — | — | — |
|  | (RA-2) | — | — | — | — | — | — |
|  | (RA-3) | 70 | — | — | — | — | — |
|  | (RA-4) | — | 70 | — | — | — | — |
|  | (RA-5) | — | — | 70 | — | — | — |
|  | (RA-6) | — | — | — | 70 | — | — |
|  | (RA-7) | — | — | — | — | 70 | — |
|  | (RA-8) | — | — | — | — | — | 70 |
| Carbon black MA-100 |  | 8 | 8 | 8 | 8 | 8 | 8 |
| Carnauba wax |  | 5 | 5 | 5 | 5 | 5 | 5 |
| Charge control agent T-77 |  | 1 | 1 | 1 | 1 | 1 | 1 |
| Volume average particle diameter (μm) |  | 8.0 | 8.0 | 7.9 | 8.0 | 8.0 | 8.0 |
| Particle size distribution |  | 1.22 | 1.23 | 1.24 | 1.22 | 1.23 | 1.24 |
| Minimum fixing temperature [° C.] |  | 145 | 135 | 150 | 140 | 135 | 140 |
| Heat-resistant storage stability |  | X | X | ○ | X | ○ | ○ |
| Moisture heat-resistant storage stability |  | X | X | ⊙ | X | ○ | ○ |
| Member staining property |  | X | X | X | Δ | X | X |

Production Example 3

Preparation of Precursor (B0-1) Solution

A reaction vessel equipped with a stirrer, a heating and cooling apparatus, a thermometer, a cooling tube, and a nitrogen introduction tube was charged with 681 parts by weight of an EO 2 mol adduct of bisphenol A, 81 parts by weight of a PO 2 mol adduct of bisphenol A, 275 parts by weight of terephthalic acid, 7 parts by weight of adipic acid, 22 parts by weight of trimellitic anhydride, and 2 parts by weight of dibutyltin oxide, followed by a dehydration reaction performed under normal pressure at 230° C. for 5 hours, and then a dehydration reaction was performed at a reduced pressure of 0.01 to 0.03 MPa for 5 hours, affording a polyester resin.

A pressure-resistant reaction vessel equipped with a stirrer, a heating and cooling apparatus, and a thermometer was charged with 350 parts by weight of the polyester resin, 50 parts by weight of isophorone diisocyanate, 600 parts by weight of ethyl acetate, and 0.5 parts by weight of ion exchange water, and a reaction was performed in a hermetically sealed condition at 90° C. for 5 hours, affording a solution of a precursor (B0-1) having an isocyanate group at a terminal of the molecule. The precursor (B0-1) solution had a urethane group concentration of 5.2% by weight and a urea group concentration of 0.3% by weight. The solid concentration was 45% by weight.

Production Example 4

Production of Particulate Dispersion Liquid (1)

A reaction vessel equipped with a stirrer, a heating and cooling apparatus, a thermometer, a cooling tube, and a nitrogen introduction tube was charged with 690.0 parts by weight of water, 9.0 parts by weight of polyoxyethylene monomethacrylate sulfate sodium salt "Eleminol RS-30" [produced by Sanyo Chemical Industries, Ltd.], 90.0 parts by weight of styrene, 90.0 parts by weight of methacrylic acid, 110.0 parts by weight of butyl acrylate, and 1.0 part by weight of ammonium persulfate, which were stirred at 350 rpm for 15 minutes to afford a white emulsion. Subsequently, the temperature was raised to 75° C. and a reaction was carried out at this temperature for 5 hours. Furthermore, 30 parts by weight of a 1% by weight of aqueous solution of ammonium persulfate was added, and the mixture was matured at 75° C. for 5 hours, affording a particulate dispersion liquid (1) of a vinyl resin (a styrene-methacrylic acid-butyl acrylate-methacrylic acid ethylene oxide adduct sulfate sodium salt copolymer). The volume average particle diameter of the particles dispersed in the particulate dispersion liquid (1) was measured with a laser diffraction/scattering particle size distribution analyzer "LA-920" [manufactured by HORIBA, Ltd.] to be 0.1 μm. In addition, a part of the particulate dispersion liquid (1) was taken out and Tg and Mw were measured. The Tg was 65° C. and the Mw was 150,000.

Production Example 5

Production of Colorant Dispersion Liquid (1)

A reaction vessel equipped with a stirrer, a heating and cooling apparatus, a thermometer, a cooling tube, and a nitrogen introduction tube was charged with 557 parts by weight (17.5 parts by mol) of propylene glycol, 569 parts by weight (7.0 parts by mol) of dimethyl terephthalate, 184 parts by weight (3.0 parts by mol) of adipic acid, and 3 parts by weight of tetrabutoxytitanate as a condensation catalyst, these were caused to react with one another at 180° C. under a nitrogen gas flow for 8 hours while generated methanol being distilled off. Subsequently, a reaction was performed for 4 hours under a nitrogen gas flow while the temperature was gradually raised to 230° C. and generated propylene glycol and water were distilled off, and further the reaction was performed under a reduced pressure of 0.007 to 0.026 MPa for one hour. The recovered propylene glycol was 175 parts by weight (5.5 parts by mol). Subsequently, after cooling to 180° C., 121 parts by weight (1.5 parts by mol) of trimellitic anhydride was added and a reaction was performed, and after being allowed to react in a hermetically sealed condition under normal pressure for 2 hours, this was further caused to react under normal pressure at 220° C. until the softening point reached 180° C., affording a polyester resin (Mn=8,500).

A beaker was charged with 20 parts by weight of copper phthalocyanine, 4 parts by weight of a colorant dispersant "SOLSPERSE 28000" [produced by Avecia Ltd.], 20 parts by weight of the polyester resin obtained, and 56 parts by weight of ethyl acetate, which were then uniformly dispersed by stirring, and subsequently copper phthalocyanine was microdispersed with a beads mill, affording a colorant dispersion liquid (1). The colorant dispersion liquid (1) had a volume average particle diameter of 0.2 μm.

Production Example 6

Production of Modified Wax (1)

A pressure-resistant reaction vessel equipped with a stirrer, a heating and cooling apparatus, a thermometer, and a dropping vessel was charged with 454 parts by weight of xylene and 150 parts by weight of low molecular weight polyethylene "SANWAX LEL-400" [softening point: 128° C., produced by Sanyo Chemical Industries, Ltd.]. After nitrogen replacement, the temperature was raised to 170° C. under stirring and then a mixed solution of 595 parts by weight of styrene, 255 parts by weight of methyl methacrylate, 34 parts by weight of di-tert-butyl peroxyhexahydroterephthalate, and 119 parts by weight of xylene was dropped over 3 hours at 170° C., and then the resultant was held at the same temperature for 30 minutes. Subsequently, xylene was distilled off under a reduced pressure of 0.039 MPa, affording a modified wax (1). The graft chain of the modified wax (1) had an SP value of 10.35 $(cal/cm^3)^{1/2}$, an Mn of 1,900, an Mw of 5,200, and a Tg of 56.9° C.

Production Example 7

Production of Mold Release Agent Dispersion Liquid (1)

A reaction vessel equipped with a stirrer, a heating and cooling apparatus, a cooling tube, and a thermometer was charged with 10 parts by weight of paraffin wax "HNP-9" [temperature of peak with maximum heat of fusion: 73° C., produced by Nippon Seiro Co., Ltd.], 1 part by weight of the modified wax (1) obtained in Production Example 6, and 33 parts by weight of ethyl acetate. The temperature was raised to 78° C. under stirring, and stirring was performed at this temperature for 30 minutes, followed by cooling to 30° C. over one hour, thereby precipitating the paraffin wax in the form of particulates, which were then moisture ground with an Ultra Visco Mill (manufactured by AIMEX CO., LTD.), affording a mold release agent dispersion liquid (1). The volume average particle diameter was 0.25 μm.

Production Examples 8 to 11

Production of Resin Solutions (C-1) to (C-3), and (RC-1)

Resin solutions (C-1) to (C-3) and (RC-1) were prepared by the following method using the polyester resins (A-1) to (A-3) obtained in Examples 1 to 3 and the polyester resin (RA-1) obtained in Comparative Example 1.

A reaction vessel equipped with a stirrer and a thermometer was charged with 100 parts by weight of each of the polyester resins (A-1) to (A-3), (RA-1), 30 parts by weight of the colorant dispersion liquid (1) obtained in Production Example 5, 140 parts by weight of the mold release agent dispersion liquid (1) obtained in Production Example 7, and 153 parts by weight of ethyl acetate, and then a toner binder was dissolved homogeneously by stirring. Thus, resin solutions (C-1) to (C-3) and (RC-1) were obtained.

Production Example 12

Synthesis of Curing Agent (β-1)

A reaction vessel equipped with a stirrer, a heating and cooling apparatus, a cooling tube, and a thermometer was charged with 50 parts by weight of isophoronediamine and 300 parts by weight of methyl ethyl ketone, which were then reacted together at 50° C. for 5 hours, followed by solvent removal, and thus, a ketimine curing agent (β-1) was obtained. The curing agent (β-1) had a total amine value of 415.

Examples 33 to 35, Comparative Example 17

Toners were produced by the following method using the resin solutions (C-1) to (C-3) and (RC-1) produced in Production Examples 8 to 11. A beaker was charged with 170.2 parts by weight of ion exchanged water, 0.3 parts by weight of the particulate dispersion liquid (1) obtained in Production Example 4, 1 part by weight of sodium carboxymethyl cellulose, 36 parts by weight of a 48.5 wt % aqueous solution of sodium dodecyldiphenyl ether disulfonate "Eleminol MON-7" [produced by Sanyo Chemical Industries, Ltd.], and 15.3 parts by weight of ethyl acetate, which were then stirred to dissolve homogeneously. Subsequently, the temperature was raised to 50° C., and 11.2 parts by weight of the precursor (B0-1) solution obtained in Production Example 3, 5.5 parts by weight of the curing agent (β-1) obtained in Production Example 12, and 63.8 parts by weight of each of the resin solutions (C-1) to (C-3) and (RC-1) were charged under stirring with a TK autohomomixer at 10,000 rpm at 50° C., and were stirred for 2 minutes. Subsequently, this mixed liquid was transferred to a reaction vessel equipped with a stirrer and a thermometer, and ethyl acetate was distilled away until its concentration reached 0.5% by weight or less at 50° C., affording an aqueous resin dispersion of toner particles. Subsequently, washing and filtration were performed, and the resultant was dried at 40° C. for 18 hours to a volatile content of 0.5% by weight or less, affording toners (D-18) to (D-20) of the present invention and a comparative toner (RD-9).

Physical properties and evaluated results of performance of the toners (D-18) to (D-20) and (RD-9) of Examples 33 to 35 and Comparative Example 17 are shown in Table 5.

Physical properties and evaluated results of performance of the toners (D-21), (D-22) and (RD-10) of Examples 36 and 37 and Comparative Example 18 are shown in Table 5.

Example 38

In an experiment apparatus of FIG. 1, first, valves V1, V2 were closed, and carbon dioxide (purity 99.99%) was introduced from a vessel B2 into a particle collecting vessel T4 using a pump P4, the pressure and the temperature in the T4 was adjusted to 14 MPa and 40° C. Further, a resin solution tank T1 was charged with the resin solution (C-1), and a particulate dispersion liquid tank T2 was charged with the particulate dispersion liquid 1. Next, liquid carbon dioxide in a vessel B1 was introduced into a dispersion vessel T3 by using a pump P3, and the dispersion vessel T3 was controlled to a supercritical state (9 MPa, 40° C.), and also the particulate dispersion liquid 1 was introduced from the tank T2 by using a pump P2. Next, a mixed liquid of the resin solution (C-1) was introduced into the dispersion vessel T3 from the tank T1 using the pump P1 while the inside of the dispersion vessel T3 was stirred at 2,000 rpm. The internal pressure of the T3 after introduction was 14 MPa.

The weight ratio of the composition charged into the dispersion vessel T3 is as follows.

TABLE 5

| | Example 33 | Example 34 | Example 35 | Comparative Example 17 | Example 36 | Example 37 | Comparative Example 18 | Example 38 | Example 39 | Comparative Example 19 |
|---|---|---|---|---|---|---|---|---|---|---|
| Toner | (D-18) | (D-19) | (D-20) | (RD-9) | (D-21) | (D-22) | (RD-10) | (D-23) | (D-24) | (RD-11) |
| Polyester resin (A) | (A-1) | (A-2) | (A-3) | (RA-1) | (A-1) | (A-2) | (RA-1) | (A-1) | (A-2) | (RA-1) |
| Resin solution | (C-1) | (C-2) | (C-3) | (RC-1) | (C-1) | (C-2) | (RC-1) | (C-1) | (C-2) | (RC-1) |
| Volume average particle diameter (μm) | 5.2 | 5.1 | 5.2 | 5.5 | 5.1 | 5.5 | 5.3 | 5.0 | 5.3 | 5.4 |
| Particle size distribution | 1.13 | 1.14 | 1.13 | 1.18 | 1.14 | 1.12 | 1.17 | 1.16 | 1.15 | 1.19 |
| Minimum fixing temperature (° C.) | 130 | 135 | 135 | 140 | 130 | 130 | 145 | 135 | 135 | 145 |
| Heat-resistant storage stability | ○ | ○ | ○ | X | ○ | ○ | X | ○ | ○ | X |
| Moisture heat-resistant storage stability | ◉ | ○ | ◉ | X | ○ | ◉ | X | ◉ | ◉ | X |
| Member staining property | ◉ | ◉ | ◉ | Δ | ◉ | ◉ | X | ◉ | ◉ | Δ |

Examples 36, 37, Comparative Example 18

Toners were produced by the following method using the resin solutions (C-1), (C-2) and (RC-1) produced in Production Examples 8, 9 and 11. A beaker was charged with 108 parts by weight of decane and 2.1 parts by weight of the particulate dispersion liquid (1), and then they were stirred to dissolve homogeneously. Subsequently, the temperature was raised to 50° C., and 11.2 parts by weight of the precursor (B0-1) solution, 5.5 parts by weight of the curing agent (β-1), and 63.8 parts by weight of each of the resin solutions (C-1), (C-2) and (RC-1) were charged under stirring with a TK autohomomixer at 10,000 rpm at 50° C., and were stirred for 2 minutes. Subsequently, this mixed liquid was transferred to a reaction vessel equipped with a stirrer and a thermometer, and ethyl acetate was distilled away until its concentration became 0.5% by weight or less at 50° C., and subsequently, washing and filtration were performed, and the resultant was dried at 40° C. for 18 hours to a volatile content of 0.5% by weight or less, affording toners (D-21) and (D-22) of the present invention and a comparative toner (RD-10).

Resin solution (C-1): 490 parts by weight
Particulate dispersion liquid (1): 45 parts by weight
Carbon dioxide: 550 parts by weight The weight of the introduced carbon dioxide was determined by calculating the density of carbon dioxide by the equation of state described in the following document at the temperature (40° C.) and the pressure (15 MPa) of carbon dioxide, and multiplying this by the volume of the dispersion vessel T3 (the same applies hereinafter).

Document: Journal of Physical and Chemical Reference data, vol. 25, pp. 1509 to 1596

After introducing the resin solution (C-1), stirring was conducted for 1 minute, affording a dispersion (X1-1) in which the resin particle (D-23) was dispersed in supercritical carbon dioxide. Next, the dispersion (X1-1) was transferred from T3 to T4 by opening the valve V1 and introducing the supercritical carbon dioxide from B1 into T3 and T4 using P3. The degree of opening of V2 was controlled so that the pressure might be kept constant during the transfer of the dispersion (X1-1) from T3 to T4. This operation was conducted for 30 seconds, and then V1 was closed. By this operation, the solvent was extracted from the resin dispersion (X1) transferred into T4. Further, T4 was heated to 60°

C. and kept for 15 minutes. By this operation, particulates in the particulate dispersion liquid 1 was adhered to the surface of a resin particle (Y-1) formed from the resin solution (C-1), and thus a resin particle (D-23) was generated.

Next, carbon dioxide was introduced from the pressure vessel B2 into the particle collecting vessel T4 using the pump P4 while controlling the degree of opening of the pressure control valve V2, thereby the pressure was kept at 14 MPa.

By this operation, the carbon dioxide fluid containing the solvent was discharged into a solvent trap vessel T5 and a resin particle (D-24) was captured in a filter F1. The operation of introducing carbon dioxide from the pressure vessel B2 into the particle collecting vessel T4 using the pump P4 was stopped when carbon dioxide was introduced into the particle collecting vessel T4 in an amount 5 times the weight of carbon dioxide introduced into the above dispersion vessel T3. At the time of this stopping, the operation of replacing the carbon dioxide fluid containing a solvent with carbon dioxide fluid not containing a solvent and capturing the resin particle (D-23) in the filter F1 was completed. Further, the pressure control valve V2 was opened little by little and the internal pressure of the particle collecting vessel was reduced to the atmospheric pressure. Thus, the toner of the present invention (D-23) captured in the filter F1 was obtained, in which particle a coating film derived from particulates contained in the particulate dispersion liquid 1 had been formed on the surface of the resin particle (Y-1) and a colorant and a wax had been dispersed in the (Y-1) uniformly.

Example 39

A toner (D-24) of the present invention was obtained in the same way as in Example 40 except that the resin solution (C-1) was changed to the resin solution (C-2).

Comparative Example 19

A comparative toner (RD-11) was obtained in the same way as in Example 40 except that the resin solution (C-1) was changed to the resin solution (RC-1).

Physical properties and evaluated results of performance of the toners (D-23), (D-24) and (RD-11) of Examples 38 and 39 and Comparative Example 19 are shown in Table 5.
<Physical Properties and Performance Evaluation>

For each of the toners (D-1) to (D-24) and (RD-1) to (RD-11), a volume average particle diameter and a particle size distribution were measured by the following methods, and the low-temperature fixability, the durability, the heat-resistant storage stability, the moisture heat-resistant storage stability, and the member staining property were evaluated.

[1] Volume Average Particle Diameter and Particle Size Distribution

Each of the toners (D-1) to (D-24) and (RD-1) to (RD-11) was dispersed in water, and then the volume average particle diameter and the number average particle diameter thereof were measured with a Coulter counter "Multisizer III" (manufactured by Beckman Coulter Inc.). Additionally, a particle size distribution (volume average particle diameter/ number average particle diameter) was calculated from the measured results.

[2] Low-Temperature Fixability

"AEROSIL R972" [produced by Nippon Aerosil Co., Ltd.] is added in an amount of 1.0% by weight to each of the toners (D-1) to (D-24) and (RD-1) to (RD-11) and the mixture is stirred well to become uniform, and the resulting powder is put on a paper sheet uniformly in 0.6 mg/cm$^2$ (In the method of putting the powder herein on the paper sheet is used a printer from which a heat fixer has been detached. Another method may be used as long as the powder can be put uniformly in that weight density.). The temperature at which cold offset occurred when the resultant paper was caused to pass through a pressure roller at a fixing rate (pressure roller circumferential rate) of 213 mm/sec and a fixing pressure (pressure of pressure roller) of 10 kg/cm$^2$ was measured. A lower temperature at which cold offset occurred means that low-temperature fixability is better.

[3] Durability

A 50-cc stopperd glass bottle was charged with 1.0 part by weight of each of the toners (D-1) to (D-24), (RD-1) to (RD-11), 0.1 parts by weight of "AEROSIL R972" [produced by Nippon Aerosil Co., Ltd.], and 10 g of an iron powder "F-150" [produced by Nippon Teppun Co., Ltd.] weighed precisely, and then the bottle was sealed with the stopper and vibrated at 15 Hz for 5 hours in an atmosphere at 23° C. and 50%RH. Then, the resultant was sieved through a sieve with an opening size of 106 μm, and the toner remaining on the sieve was judged visually and the durability was evaluated according to the following criteria.

[Evaluation Criteria]

⊙: No toner remains on a sieve.

○: Blocking occurs and a blocked toner remains on a sieve, but it is unblocked easily if a force is applied.

×: Blocking occurs and a blocked toner remains on a sieve, and it is not unblocked even if a force is applied.

[4] Heat-Resistant Storage Stability

Each of the toners (D-1) to (D-24) and (RD-1) to (RD-11) was left at rest in an atmosphere of 40° C. for one day and then the degree of blocking was judged visually, and the heat-resistant storage stability was evaluated according to the following criteria.

[Evaluation Criteria]

○: No blocking occurred.

×: Blocking occurred.

[5] Moisture Heat-Resistant Storage Stability

Each of the toners (D-1) to (D-24) and (RD-1) to (RD-11) was left at rest in an atmosphere of 40° C. and a relative humidity of 80% for 20 hours and then the degree of blocking was judged visually, and the moisture heat-resistant storage stability was evaluated according to the following criteria.

[Evaluation Criteria]

⊙: No blocking occurs.

○: Blocking occurs, but a blocked toner is unblocked easily if a force is applied.

×: Blocking occurs, and a blocked toner is not unblocked even if a force is applied.

[6] Member Staining Property

A 50-mL resin bottle was charged with 1.0 part by weight of each of the toners (D-1) to (D-24) and (RD-1) to (RD-11) and 10 g of an iron powder "F-150" [produced by Nippon Teppun Co., Ltd.] weighed precisely, and then the bottle was sealed and vibrated at 15 Hz for 48 hours in an atmosphere at 40° C. and a relative humidity of 80%, and the contents were thereafter taken out. Subsequently, the inner wall of the bottle was blown with dry nitrogen gas and then the inner wall surface was observed with a microscope, and the amount of fouling was evaluated according to the following criteria.

[Evaluation Criteria]

⊙: No fouling is observed.

○: Only a slight amount of thin layer fouling is observed.

Δ: A small amount of thin layer fouling is observed.

×: A large, layered or aggregated fouling is observed.

INDUSTRIAL APPLICABILITY

Since a toner using the toner binder of the present invention is excellent in low-temperature fixability, heat-resistant storage stability, moisture heat-resistant storage stability, and member staining property, it is useful as an electrophotographic toner, an electrostatic recording toner, an electrostatic printing toner, etc.

DESCRIPTION OF REFERENCE SIGNS

T1: Resin solution tank
T2: Particulate dispersion liquid tank
T3: Dispersion vessel (maximum allowable working pressure: 20 MPa, maximum allowable working temperature: 100° C., with a stirrer)
T4: Particle collection tank (maximum allowable working pressure: 20 MPa, maximum allowable working temperature: 100° C.)
F1: Ceramics filter (mesh: 0.5 μm)
T5: Solvent trap
B1, B2: Carbon dioxide vessel
P1, P2: Solution pump
P3, P4: Carbon dioxide pump
V1, V3, V4, V5, V6, V7, V8: Valve
V2: Pressure control valve

The invention claimed is:

1. A toner binder comprising a polyester resin (A) having, as constitutional units, a polycarboxylic acid (a1) as a polycarboxylic acid component and a polyhydric alcohol (a2) as a polyhydric alcohol component and being esterified with a monocarboxylic acid (a3) and/or a monohydric alcohol (a4) at a part of the terminals thereof, wherein the ester group concentration of (A) based on the weight of (A) is 16 to 30% by weight, the polyhydric alcohol (a2) comprises an alkylene glycol (a21) having three carbon atoms and a diol (a22) having an aromatic ring, the molar ratio of (a21) to (a22) is (a21)/(a22)=5/95 to 70/30, and (A) fulfills the following condition 1:

$$229 \times (ECON) + 90 \times (OHV) \leq 12{,}000 \quad \text{[Condition 1]}$$

wherein (ECON) denotes a value representing the ester group concentration of (A) expressed by the unit of % by weight, and (OHV) denotes a value representing the hydroxy value of (A) expressed by the unit of mgKOH/g.

2. The toner binder according to claim 1, wherein the polyester resin (A) is a polyester resin esterified at a part of the terminals thereof with the monocarboxylic acid (a3) and the monocarboxylic acid (a3) is an aromatic monocarboxylic acid (a31).

3. The toner binder according to claim 1, wherein the acid value of the polyester resin (A) is 40 mgKOH/g or less, and the amount of water in (A) after storing (A) under conditions of 40° C. and a relative humidity of 80% for 20 hours is 12,000 ppm or less based on the weight of (A).

4. The toner binder according to claim 1, wherein the absolute value of the difference between a ½ falling temperature (T1) and a ½ falling temperature (T0) is 8° C. or less as measured with a flow tester at a temperature ramp-up rate of 6° C./min and a load of 1.96 MPa, wherein the ½ falling temperature (T1) is a temperature at which half of a measurement sample of the polyester resin (A) flows out during extrusion of 1 g of the measured resin (A) through a nozzle having a diameter of 1 mm and a length of 1 mm after subjecting the (A) to storage under conditions of 40° C. and a relative humidity of 80% for 20 hours, and the ½ falling temperature (T0) is a temperature measured for (A) before the storage under conditions of 40° C. and a relative humidity of 80% for 20 hours.

5. The toner binder according to claim 1, wherein the diol (a22) having an aromatic ring is an alkylene oxide adduct of bisphenol A.

6. The toner binder according to claim 2, wherein the aromatic monocarboxylic acid (a31) is benzoic acid.

7. The toner binder according to claim 1, wherein the glass transition temperature of the polyester resin (A) is 40 to 80° C.

8. The toner binder according to claim 1, wherein the hydroxy value of the polyester resin (A) is 30 mgKOH/g or less.

9. The toner binder according to claim 1, wherein the number average molecular weight of the polyester resin (A) is 500 to 4000.

10. A toner comprising the toner binder according to claim 1, a colorant, and a mold release agent.

* * * * *